(12) United States Patent
Ono et al.

(10) Patent No.: US 8,757,902 B2
(45) Date of Patent: Jun. 24, 2014

(54) BLACK HEAT RESISTANT LIGHT SHADING FILM AND PRODUCTION METHOD THEREOF, AND, DIAPHRAGM, LIGHT INTENSITY ADJUSTING MODULE AND HEAT RESISTANT LIGHT SHADING TAPE USING THE SAME

(75) Inventors: Katsushi Ono, Ichikawa (JP); Tokuyuki Nakayama, Ichikawa (JP)

(73) Assignee: Toyobo Co., Ltd., Osaka (JP)

( * ) Notice: Subject to any disclaimer, the term of this patent is extended or adjusted under 35 U.S.C. 154(b) by 56 days.

(21) Appl. No.: 13/503,504

(22) PCT Filed: Nov. 2, 2010

(86) PCT No.: PCT/JP2010/069486
§ 371 (c)(1),
(2), (4) Date: Apr. 23, 2012

(87) PCT Pub. No.: WO2011/062055
PCT Pub. Date: May 26, 2011

(65) Prior Publication Data
US 2012/0251095 A1    Oct. 4, 2012

(30) Foreign Application Priority Data

Nov. 20, 2009  (JP) ................................. 2009-265550
Oct. 7, 2010   (JP) ................................. 2010-227677

(51) Int. Cl.
    *G03B 9/02*    (2006.01)
(52) U.S. Cl.
    USPC ............................. 396/505; 359/601; 359/614
(58) Field of Classification Search
    USPC ........... 396/505, 452; 359/227, 452, 601, 614
    See application file for complete search history.

(56) References Cited

U.S. PATENT DOCUMENTS

| 5,078,936 | A  | 1/1992  | Parish et al. |
| 6,818,287 | B1 | 11/2004 | Ogawa et al. |
| 2008/0213555 | A1* | 9/2008  | Ono et al. ................... 428/215 |
| 2008/0254256 | A1* | 10/2008 | Abe et al. .................... 428/141 |
| 2011/0068476 | A1* | 3/2011  | Kawasaki et al. ............. 257/774 |
| 2011/0109970 | A1* | 5/2011  | Abe et al. .................... 359/601 |
| 2011/0164297 | A1* | 7/2011  | Abe et al. .................... 359/227 |

FOREIGN PATENT DOCUMENTS

| CA | 708896 B       | 5/1965  |
| JP | 01-120503 A    | 5/1989  |
| JP | 02-116837 A    | 5/1990  |
| JP | 04-009802 A    | 1/1992  |
| JP | 06-212075 A    | 8/1994  |
| JP | 09-274218 A    | 10/1997 |
| JP | 2000-075353 A  | 3/2000  |
| JP | 2003-161977 A  | 6/2003  |
| JP | 2007-211084 A  | 8/2007  |
| JP | 2008-114463 A  | 5/2008  |
| JP | 2008-158479 A  | 7/2008  |
| JP | 2008-225099 A  | 9/2008  |
| WO | 2009/014264 A1 | 1/2009  |

OTHER PUBLICATIONS

International Search Report of PCT/JP2010/069486, dated Dec. 14, 2010.
Japanese Office Action dated Aug. 27, 2013, issued in corresponding Japanese Patent Application No. 2010-227677 (2 pages).

* cited by examiner

*Primary Examiner* — Clayton E Laballe
*Assistant Examiner* — Warren K Fenwick
(74) *Attorney, Agent, or Firm* — Westerman, Hattori, Daniels & Adrian, LLP

(57) ABSTRACT

A black heat resistant light shading film usable as a shutter blade or a fixed diaphragm, a diaphragm blade for a diaphragm device for a light intensity adjusting module. The black heat resistant light shading film is formed with fine unevennesses at the both surfaces of a resin film having a heat resistance of 155° C. or higher. The resin film is a black film containing a black pigment and an inorganic filler and thickness of the black heat resistant light shading film is 25 μm or less. Surface roughness (arithmetic average height Ra) of the both surfaces is 0.2 to 2.2 μm and an average optical density, which is an index of light shading performance of light in a wavelength region of 380 to 780 nm, is 3.5 or higher.

18 Claims, No Drawings

BLACK HEAT RESISTANT LIGHT SHADING FILM AND PRODUCTION METHOD THEREOF, AND, DIAPHRAGM, LIGHT INTENSITY ADJUSTING MODULE AND HEAT RESISTANT LIGHT SHADING TAPE USING THE SAME

TECHNICAL FIELD

The present invention relates to a black heat resistant light shading film, and a diaphragm, alight intensity adjusting module and a heat resistant light shading tape using the same, in more detail, the present invention relates to a black heat resistant light shading film superior in heat resistance, high light shading performance, low reflectivity and low surface glossiness, which are used as optical device parts such as a shutter blade or a diaphragm blade for such as a lens shutter of a digital camera or a digital video camera, a fixed diaphragm in a lens unit of a cellar camera phone or an in-vehicle monitor, or a diaphragm blade for adjusting a light intensity for projector, and a production method thereof, and a diaphragm, a light intensity adjusting module and a heat resistant light shading tape using the same.

BACKGROUND ART

In recent years, development of a high speed (mechanical) shutter of the digital camera has been actively promoted. It aims is to make possible to obtain clear images by taking a picture of a subject moving at an ultrahigh speed without blurring by making shutter speed high. Generally, opening/closing of shutter is performed by rotating or moving a plurality of blades called as shutter blades, however, in order to obtain a high shutter speed, it is absolutely essential to be lightweight and high slidability so that the shutter blade can correspond to instantaneous motion and stopping. Further, since the shutter blade has a role to shade light by covering the front surface of a photosensitive material such as film or an image sensor such as CCD, CMOS in a state when a shutter is closed, it is desired to have complete light shading performance. Moreover, the shutter blade is desired to be a low reflectivity on the surface of the blade, that is, a high blackness of surface color, in order to prevent an occurrence of leakage of light among each blade when a plurality of shutter blades work while overlapping each other.

As for a fixed diaphragm which is inserted into a lens unit of digital camera and has a role to reduce light intensity to a certain level and transfer the light to an image sensor, the shutter blade is also demanded to have low reflectivity of the surface, that is, a high blackness, because occurrence of light reflection on the surface of a diaphragm gives stray light and impairs sharp images.

Also, in a cellar phone having a photographing function, that is, a cellar camera phone, a compact mechanical shutter has recently begun to be installed in a lens unit, in order to allow taking a picture having fine pixel and high image quality, similarly as in a digital camera. In addition, a fixed diaphragm has been inserted in a lens unit of a cellar phone. A mechanical shutter to be incorporated in the above cellar phone is demanded to work by power saving as compared with a general digital camera. Therefore, demand for weight saving of shutter blades is demanded particularly strong.

To mount a camera module or a lens unit, conventionally parts thereof have been manufactured using adhesives individually. However, in a recent cellar camera phone, when assembling the lens unit, in order to reduce manufacturing cost, it has been required that each of the members such as a lens, a fixed diaphragm, and shutter is manufactured by a reflow step. Accordingly, there has been demanded heat resistance in addition to low surface reflectivity and blackness, for a shutter blade or a fixed diaphragm used for them.

This reflow step has been put to practical application in a manufacturing method for a camera module such as a recent digital camera, a cellar camera phone, aiming at compact sizing, making low profile, and simplification of manufacturing steps. By a practical application of the reflow step, a manufacturing method will be shifted to such a way as all assembly will be made in a wafer state where each of the parts is not separated to each chip unit, and after completion of mounting onto a circuit board using die bonding, solder ball or the like, this is subjected to dicing to a chip size individually to obtain a final product. It should be noted that parts to be used here have been fostered in packaging industry of a semiconductor chip in recent years, and called a wafer level chip size package (hereafter, referred to as WLCSP).

Use of this WLCSP enables to reduce the number of parts and thus is effective to compact sizing, making low profile of a camera module. However, generation of burr or the like at a punched end face causes trouble in lamination of wafers themselves, in assembling a camera module with the WLCSP structure.

In addition, in the case where a flexible printed circuit board (hereafter, referred to as FPC) becomes thinner, light injected from the FPC side at the rear face of an image sensor becomes not neglected, in addition to leakage of light from the front face of the image sensor such as CCD, CMOS. Incident light from the rear face of this image sensor makes a ghost image of a printed circuit of the FPC in a photographing area, which deteriorates quality of a picture image, therefore shading of the leakage of light from the FPC side becomes necessary.

In addition, as a recent trend of a device mounted on an automobile, there is a trend of mounting a monitor using a video camera such as a back view monitor. Also, a fixed diaphragm is used in a lens unit of this video camera monitor, and the surface of the diaphragm is demanded to have low reflectivity and blackness to prevent stray light similarly. In addition, in the lens unit of the in-vehicle video camera, heat resistance is required so as not to impair function, even under high temperature use environment such as the burning sun in midsummer, and heat resistance is required also for a fixed diaphragm material.

On the contrary, a liquid crystal projector, which can watch as a home theater with a large-sized screen, has recently been rapidly becoming popular at home. Since high image quality is intensely demanded in order to enable to enjoy sharp and high contrast images, even in such a bright environment as in a living room, technology to obtain an image quality having high lightness by using a high power light source has been attempted. In an optical system of a projector, a diaphragm device for a light intensity adjusting module (auto-iris), which adjusts light intensity from a lamp light source, has been used inside or on side face of the lens system. In the diaphragm device for the light intensity adjusting module, a plurality of diaphragm blades overlap each other, similarly as in the shutter, to adjust an aperture through which light passes. In such diaphragm blades of diaphragm device for the light intensity adjusting module, low reflectivity on the surface and weight saving are also demanded due to the same reasons as in the case of the shutter blades. At the same time, in the diaphragm blades of diaphragm device for the light intensity adjusting module, heat resistance against heating by irradiation of a lamp light has also been required. That is, it is because impairment of low reflectivity of the blade material by light irradiation causes stray light, making impossible to take a vivid picture image.

In the above-described shutter blade, fixed diaphragm, and a diaphragm blade of a diaphragm device for the light intensity adjusting module, as a light shading plate, the following ones are used in response to required characteristics.

When heat resistance is required, a thin plate of metal such as SUS, SK material, Al, Ti is generally used as a substrate. Although there is a light shading plate in which a metal thin plate itself is used as a light shading plate, this is not preferable when influence of stray light by reflected light from the surface should be avoided because this plate has metallic luster. On the contrary, a light shading plate, in which a black lubricating coating is made on a metal thin plate, has low reflectivity and blackness, but cannot generally be used in high temperature environment because a coated part is inferior in heat resistance. Furthermore, in order to suppress light reflection at the processed end face, after processing to a predetermined shape, a step for black dying processing of the processed end face becomes necessary, which has a problem of increasing manufacturing cost.

Accordingly, in Patent Literature 1, a light shading material in which a hard carbon film has been formed on the surface of a blade material made of a metal such as aluminum alloy has been disclosed. However, even if a hard carbon film is formed on the surface, low reflection characteristics cannot be realized, and generation of stray light by reflected light cannot be avoided. In any of the above cases, when a light shading plate using a metal thin plate as a substrate is used for a shutter blade or a diaphragm blade, there are such problems that torque of a drive motor for driving blades becomes great to increase power consumption, due to its heavy weight; as well as shutter speed cannot be raised; noise generates by contacting of blades themselves; and the like.

On the contrary, there has been proposed a light shading plate using a resin film as a substrate (refer to PATENT LITERATURES 2 and 3). In this PATENT LITERATURE 2, there has been proposed a light shading plate using a matted processed resin film to reduce reflection on the surface, or a film-like light shading plate furnished with lusterless property by forming a large number of fine unevennesses. In addition, in PATENT LITERATURE 3, there has been proposed a light shading film in which a thermosetting resin containing a lusterless paint is coated on a resin film. However, in these proposals, sufficient light shading performance is furnished to a light shading plate, by using a resin film as a substrate, where a black pigment such as carbon black is impregnated in polyethylene terephthalate (PET) or the like, and forming a light shading layer impregnated with a black pigment at the surface of the substrate. That is, sufficient light shading performance cannot be expressed only by a resin film impregnated with a black pigment. In addition, surface reflection or surface glossiness is reduced by impregnation of the black pigment or a matting agent into the light shading layer, however, it cannot prevent stray light generating by light reflection at the end face formed by processing the light shading plate.

As for a light shading plate using a resin film as a substrate, a light shading plate using polyethylene terephthalate (PET) impregnated with a black pigment, as a substrate, is widely used, from the advantages of low specific gravity, cheap cost and flexibility.

However, a PET material has a heat resistance below 150° C. and is weak in mechanical strength such as modulus of elasticity in tension, therefore it cannot be utilized as a diaphragm material for the light intensity adjusting module of a projector, irradiated by a high power lamp light, or a fixed diaphragm material or a shutter material corresponding to the reflow process. In addition, to use it as a blade part of a high speed shutter, thickness of the film has to be reduced correspondingly to speeding up of the shutter blade, however, in the case of the resin film produced by impregnating black fine particles therein, thinner film thickness cannot exhibit sufficient light shading performance. In particular, when the thickness becomes 38 μm or less, it cannot be used for a diaphragm for the light intensity adjusting module or a fixed diaphragm, or a shutter blade.

On the other hand, as for a resin film where a black pigment such as carbon black is impregnated in a resin superior in heat resistance, the following proposals have been made. For example, in PATENT LITERATURE 4, a conductive polyimide composition has been disclosed where a black pigment such as carbon black, acetylene black is impregnated in a polyimide resin having high heat resistance. In addition, in PATENT LITERATURES 5 and 6, there have been disclosed a molded body of a conductive polyimide impregnated with a black pigment such as carbon black or graphite. However, in PATENT LITERATURES 4 to 6, there is no description on surface roughness or optical characteristics such as light shading performance, direct reflectance, surface glossiness of the film and thus they cannot be evaluated as a light shading film.

In addition, with progress of compact sizing and thinning of a digital camera and a cellar camera phone, compact sizing and thinning have been required also for component parts to be mounted, in recent years. Accordingly, the present inventors have proposed a heat resistant light shading film consisting of a resin film substrate (A) having a heat resistance of 200° C. or higher, a Ni-type metal film (B) having a film thickness of 50 nm or more formed at one or both surfaces thereof by a sputtering method, and a Ni-type oxide film (C) with low reflectivity formed thereon by a sputtering method, and heat resistant light shading film having a surface roughness (arithmetic average height Ra) of 0.1 to 0.7 μm (refer to PATENT LITERATURE 7). This allowed to make the heat resistant light shading film more superior in light shading performance, heat resistance, slidability, low surface glossiness, and electric conductivity, as compared with a conventional one.

However, there has been strong requirement for a fixed diaphragm and a shutter blade, which are component parts of a lens unit in a camera module, in particular, to have a thickness of 25 μm or less, and such a shutter blade material or a fixed diaphragm material has become essential that has thin film and is superior in heat resistance, highlight shading performance, low surface glossiness, and blackness.

In PATENT LITERATURES 2 and 3, a resin film with a thickness of 25 to 250 μm is used as a substrate, and thus it is not suitable for a fixed diaphragm or a shutter blade for a digital camera or a cellar camera phone, where a film thickness of 25 μm or less is desired. On the other hand, although PATENT LITERATURE 6 has shown Example of a film thickness of about 25 μm, surface thereof is not roughened, and, in PATENT LITERATURES 4 and 5, there have been no description on film thickness.

Further, in a fixed diaphragm or a shutter blade to be used in a digital camera or a cellar camera phone, or a diaphragm blade for the light intensity adjusting module of a projector, a light shading plate, which is processed to a desired shape by machining, is used, and since the processed end face is arranged on a light passage, in the case of high reflection of light at the end face, ghost or flare or the like generates, which deteriorates quality of a picture image. Accordingly, light shading performance at the end face, low reflectivity, and low surface glossiness become important. In general, a resin film impregnated with a black pigment is used as a substrate in many cases, to absorb light injected to the end face and shade it. However, in PATENT LITERATURES 2 and 3, although a resin film impregnated with a black pigment such as carbon black is used as a substrate, since the resin film is thick, it can only be said that, the black pigment having light shading performance can be added sufficiently, and reflection of light at the end face can be suppressed. In the case of a thinner film, there is a problem of losing light shading performance at the diaphragm surface or the end face, because content of the black pigment for obtaining a good film becomes low in film manufacturing.

As explained above, conventionally, in applications requiring heat resistance, it has been inevitable to use a heavier metal thin plate, that is, a metal thin plate composed of SUS, SK material, Al, Ti or the like, as compared with a resin film. Therefore, there have problems that torque or power consumption of a drive motor for driving a blade increases, or shutter speed cannot be raised, noise generates by contact of blades themselves, and further manufacturing cost increases for processing of black dying of the surface or a processed end face. Accordingly, new shutter blades or a fixed diaphragm and diaphragm blades of a diaphragm device for the light intensity adjusting module, having sufficient light shading performance, low reflectivity at the surface and processed end face, low surface glossiness, along with lightweight character, in addition to thickness of the light shading plate to be 25 μm or less, and superior heat resistance, have been required.

CITATION LIST

Patent Literature

PATENT LITERATURE 1: JP-A-2-116837
PATENT LITERATURE 2: JP-A-1-120503
PATENT LITERATURE 3: JP-A-4-9802
PATENT LITERATURE 4: CAP. No. 708896
PATENT LITERATURE 5: U.S. Pat. No. 5,078,936
PATENT LITERATURE 6: JP-A-6-212075
PATENT LITERATURE 7: JP-A-2008-158479

SUMMARY OF INVENTION

Technical Problem

In view of the above conventional problems, it is an object of the present invention to provide a black heat resistant light shading film usable as a shutter blade or a fixed diaphragm, a diaphragm blade for a diaphragm device for a light intensity adjusting module, a heat resistant light shading tape or the like, by maintaining high light shading performance, low reflectivity at a surface or an end face, low surface glossiness and blackness, even under high temperature environment of 155° C. in air, along with a production method thereof.

Solution to Problem

The present inventors have intensively studied a way to solve the above-described conventional problems and as a result, the black heat resistant light shading film having a thickness of 25 μm or less, and an average optical density in a wavelength of 380 to 780 nm of 3.5 or higher, was obtained by containing a black pigment and an inorganic filler in one or more kinds of heat resistant resins selected from polyimide, polyamideimide, polyphenylene sulfide, polyethylene naphthalate, aramide, polyether ether ketone and polyether sulfone. And we have discovered that, by using this, characteristics such as high light shading performance, low reflectivity, low surface glossiness and lightness can be maintained, without deformation even under high temperature environment of 155° C. or higher, and further stray light injected at the end face obtained by processing to a desired shape can be absorbed by the black pigment, the stray light can be scattered by fine unevenness formed at the end face, and thus making lower reflection and lower surface glossiness can be attained, and have confirmed that it can be utilized as a diaphragm or a blade material of a digital camera, a cellar camera phone, a digital video camera, a liquid crystal projector or the like, thus completed the present invention.

That is, according to a first aspect of the present invention, there is provided a black heat resistant light shading film formed with fine unevennesses at the both surfaces of a resin film (A) having a heat resistance of 155° C. or higher, characterized in that the resin film (A) is a black film comprising a black pigment (B) and an inorganic filler (C), and thickness of the black heat resistant light shading film is 25 μm or less, surface roughness (arithmetic average height Ra) of the both surfaces is 0.2 to 2.2 μm, and further an average optical density, which is an index of light shading performance of light in a wavelength region of 380 to 780 nm, is 3.5 or higher.

In addition, according to a second aspect of the present invention, there is provided the black heat resistant light shading film, characterized in that in the first aspect the average optical density is 4.0 or higher.

In addition, according to a third aspect of the present invention, there is provided the black heat resistant light shading film, characterized in that in the first or the second aspect an average direct reflectance of the both surfaces in a wavelength range of 380 to 780 nm is 0.40% or less.

In addition, according to a fourth aspect of the present invention, there is provided the black heat resistant light shading film, characterized in that in any one of the first to the third aspects the resin film (A) is a film having, as a main component, one or more kinds of heat resistant resins selected from polyimide, polyamideimide, polyphenylene sulfide, polyethylene naphthalate, aramide, polyether ether ketone and polyether sulfone.

On the other hand, according to a fifth aspect of the present invention, there is provided the black heat resistant light shading film, characterized in that in any one of the first to the fourth aspects the black pigment (B) is a pigment consisting of one or more kinds selected from carbon black, aniline black, titanium black, inorganic pigment hematite and perylene black.

In addition, according to a sixth aspect of the present invention, there is provided the black heat resistant light shading film, characterized in that in any one of the first to the fifth aspects content of the black pigment (B) is 5 to 22 parts by weight, relative to the heat resistant resin (a solid content of 100 parts by weight).

In addition, according to a seventh aspect of the present invention, there is provided the black heat resistant light shading film, characterized in that in any one of the first to the sixth aspects the inorganic filler (C) is one or more kinds selected from alumina, a titanium oxide, silica, a zinc oxide and magnesia.

In addition, according to a eighth aspect of the present invention, there is provided the black heat resistant light shading film, characterized in that in any one of the first to the seventh aspects content of the inorganic filler (C) is 2 to 25 parts by weight, relative to the heat resistant resin (a solid content of 100 parts by weight).

In addition, according to a ninth aspect of the present invention, there is provided the black heat resistant light shading film, characterized in that in any one of the first to the eighth aspects L* (lightness) is 25 to 40, in measurement of an L*a*b* color system (JIS Z 8729), standardized by CIE (International Commission on Illumination).

In addition, according to a tenth aspect of the present invention, there is provided the black heat resistant light shading film, characterized in that in any one of the first to the ninth aspects surface glossiness of each face is 8 or less.

On the other hand, according to an eleventh aspect of the present invention, there is provided, in any one of the first to the tenth aspects, a method for producing a black heat resistant light shading film, characterized by containing and kneading at least a black pigment (B) and an inorganic filler (C) along with a solvent, into a heat resistance resin having a heat resistance of 155° C. or higher, coating this slurry onto a supporting substance, drying it to obtain a resin film (A) having a film thickness of 5 to 25 μm, and then performing matting processing, so that fine unevennesses of the both film faces have a surface roughness (arithmetic average height Ra) of 0.2 to 2.2 μm.

In addition, according to a twelfth aspect of the present invention, there is provided the method for producing a black heat resistant light shading film, characterized in that in the eleventh aspects content of the black pigment (B) is 5 to 22 parts by weight, relative to the heat resistant resin (a solid content of 100 parts by weight).

In addition, according to a thirteenth aspect of the present invention, there is provided the method for producing a black heat resistant light shading film, characterized in that in the eleventh aspect content of the inorganic filler (C) is 2 to 25 parts by weight, relative to the heat resistant resin (a solid content of 100 parts by weight).

On the other hand, according to a fourteenth aspect of the present invention, there is provided a diaphragm superior in heat resistance obtained by punching processing the black heat resistant light shading film according to any one of the first to the tenth aspects, characterized in that the end face of the obtained diaphragm has low surface glossiness.

In addition, according to a fifteenth aspect of the present invention, there is provided the diaphragm, characterized in that in the fourteenth aspect the black heat resistant light shading film is utilized in a camera module with a structure of wafer level chip size package (WLCSP).

In addition, according to a sixteenth aspect of the present invention, there is provided a blade material superior in heat resistance obtained by punching processing the black heat resistant light shading film according to any one of the first to the tenth aspects, characterized in that the end face of the obtained diaphragm has low surface glossiness.

In addition, according to a seventeenth aspect of the present invention, there is provided a light intensity adjusting module, characterized by comprising any of the diaphragm superior in heat resistance of the fourteenth and fifteenth aspects, or the blade material superior in heat resistance of the sixteenth aspect.

Further, according to a eighteenth aspect of the present invention, there is provided, in any one of the first to the tenth aspects, a heat resistant light shading tape comprising an adhesive layer at one or both surfaces of the black heat resistant light shading film.

Advantageous Effects of Invention

The black heat resistant light shading film of the present invention contains at least a black pigment and an inorganic filler in a resin having surface roughness of an arithmetic average height Ra of 0.2 to 2.2 μm, and a heat resistance of 155° C. or higher, and has a thickness of 25 μm or less, low reflectivity, high light shading performance and low surface glossiness in a visible light region (a wavelength of 380 to 780 nm), and thus is useful as various optical materials.

In addition, since the heat resistant resin contains at least a black pigment and an inorganic filler, inside of the film is black, and also color of the punching processed end face becomes black. Further, since light is absorbed by the black pigment, as well as the inorganic filler is dispersed, reflection at the end face and surface gloss can be prevented owing to uneven surface of the inorganic filler, and it is thus extremely useful as a diaphragm material corresponding to requirement of compact sizing and thinner thickness of a recent digital camera, a cellar camera phone, a digital video camera, a liquid crystal projector or the like.

Further, the black heat resistant light shading film of the present invention is superior in not only heat resistance but also punching characteristic that fracture, crack, burr or the like do not generate at the end face in punching processing. Accordingly, the black heat resistant light shading film of the present invention superior in punching characteristic is extremely useful as a diaphragm material for the WLCSP.

Further, the black heat resistant light shading film of the present invention is superior in reduced weight, because it is made of a resin film, as compared with a light shading plate based on a conventional metal thin plate. In addition, by using a resin film with high heat resistance such as polyimide and polyamide impregnated with a black pigment such as carbon black and an inorganic filler, a reduced weight black heat resistant light shading film having heat resistance even under high temperature environment of 300° C. in air can be attained, and since low reflectivity, low surface glossiness, high light shading performance and blackness at a surface or an end face are also not impaired, it can be utilized as a diaphragm blade material of a diaphragm device for the light intensity adjusting module of a liquid crystal projector, or a fixed diaphragm material and a shutter blade material which can respond to assembly by the reflow step, and a heat resistant light shading tape, and thus industrial value thereof is extremely high.

In addition, the black heat resistant light shading film of the present invention is capable of not only attaining further weight reduction due to being as thin as 25 μm or less, but also is effective as a shutter blade of a high speed shutter, due to not impairing sufficient light shading performance. Therefore, it has such a merit as being capable of attaining compact sizing of a drive motor, or compact sizing of a diaphragm device for the light intensity adjusting module or a mechanical shutter.

Further, a heat resistant light shading tape provided with an adhesive layer at one or both surfaces of the black heat resistant light shading film of the present invention is capable of absorbing the light leaked from a rear face of an image sensor such as CCD, CMOS, and inhibiting passing through thereof, by adhering onto FPC. Therefore, it is capable of suppressing re-injection of leakage of light to the image sensor, and thus contributing to stabilization of an imaging quality.

DESCRIPTION OF EMBODIMENTS

Hereinafter, the black heat resistant light shading film of the present invention, a production method thereof and applications thereof will be explained.

1. The Black Heat Resistant Light Shading Film

The black heat resistant light shading film of the present invention is a black heat resistant light shading film formed with fine unevennesses at both surfaces of a resin film (A) having a heat resistance of 155° C. or higher and a thickness of 25 μm or less, in which at least the black pigment (B) and the inorganic filler (C) are contained in one or more kinds of heat resistant resins selected from polyimide, polyamideimide, polyphenylene sulfide, polyethylene naphthalate, aramide, polyether ether ketone and polyether sulfone.

Thickness of the black heat resistant light shading film of the present invention is 25 μm or less. It is preferably 5 to 25 μm, and more preferably 10 to 20 μm. The thickness less than 5 μm provides inferior handling, which tends to provide surface defect such as scratch or fold line on the film, whereas the thickness over 25 μm could not enable to mount the film onto a diaphragm device or the light intensity adjusting module, where compact sizing and making thinner wall thickness are progressing.

(1) The Resin Film (A) Having Heat Resistance

The black heat resistant light shading film of the present invention is a heat resistant resin film having a heat resistance of 155° C. or higher, and a substrate resin of the resin film is composed of one or more kinds of heat resistant resins selected from polyimide, polyamideimide, polyphenylene sulfide, polyethylene naphthalate, aramide, polyether ether ketone and polyether sulfone.

Here, "a film having a heat resistance of 155° C. or higher" means a film having a glass transition temperature of 155° C. or higher, and as for a material not having a glass transition temperature, it means not to degenerate at a temperature of 155° C. or higher.

Polyethylene naphthalate has a heat resistance of about 200° C., and thus can be utilized under an environment of 155 to 200° C., and also useful as an application material of the present invention, because of being very cheap. In addition, polyimide, polyamideimide, polyphenylene sulfide, polyethylene naphthalate, aramide, polyether ether ketone or polyether sulfone has a heat resistance of 200° C. or higher, and thus can be utilized even under an environment over 200° C. In particular, polyimide and polyamide have the highest heat resistant temperature of 300° C. or higher, and are most suitable films for applications of the present invention.

(2) The Black Pigment (B)

In addition, the above resin film (A) should contain the black pigment in the heat resistant resin, and should be black colored. In a light shading plate where a black coating film is formed on a colored film surface other than black, and is made black colored apparently, suppression effect of reflectivity at the end face after punching processing or surface gloss cannot be obtained, when used as a fixed diaphragm mounted on a camera module such as a cellar camera phone.

An object of containing the black pigment in a heat resistant resin, as described above, is to make the surface of the light shading plate black colored, and to shade light by absorption of light at the surface and the end face after punching processing. As the black pigment, conventionally known materials may be used, for example, those mixed with one or more kinds selected from carbon black, aniline black, titanium black, inorganic pigment hematite and perylene black are included, and among these, carbon black and titanium black are particularly preferable as the black pigment. As the carbon black, furnace black, channel black, acetylene black, or the like can be used.

As a carbon black superior in both blackness and tinting strength, the one having small primary particle diameter is generally suitable, and an average particle diameter of 1 μm or smaller, in particular, 0.5 μm or smaller, and further 0.1 μm or smaller is desirable. The average particle diameter of larger than 1 μm decreases light shading performance, although having low surface glossiness, and thus is not preferable. However, too small average particle diameter, such as less than 0.01 μm, increases condensation and thus is not preferable. Titanium black is a black pigment containing certain amount of nitrogen, which is obtained by reduction of titanium dioxide.

In order to obtain a film with uniform color tone, for example, as carbon black, #7100F produced by Tokai Carbon Co., Ltd. or the like and as titanium black, for example, 13M produced by Jemco Co., Ltd., a commercial products produced by Mitsubishi Materials Corp., may be used. In addition, as aniline black, MONOLITE BLACK B produced by I. C. I. Japan Co., Ltd., as the inorganic pigment hematite, hematite V-700 produced by Nippon Ferro Technology Co., Ltd., and further as perylene black, Paliogen Black K-0084 produced by BASF Co., Ltd. are included.

Content of the above black pigment differs depending on average particle diameter, kind of the black pigment, kind of a resin (components or thickness) or the like, however, by adjusting, as appropriate, in a range of 5 to 22 parts by weight, relative to the heat resistant resin (a solid content of 100 parts by weight), the black heat resistant light shading film superior in light shading performance can be obtained. More preferable content of the above black pigment is 8 to 18 parts by weight, and particularly preferably, 10 to 15 parts by weight. The content of the black pigment below 5 parts by weight provides an average optical density of below 4.0 in a wavelength of 380 to 780 nm, impairs complete light shading performance and generates light transmission. In addition, the content of the black pigment over 22 parts by weight provides very high viscosity of a mixture and makes difficult to manufacture a uniform film, although complete light shading performance is obtained.

(3) The Inorganic Filler (C)

In the black heat resistant light shading film of the present invention, the inorganic filler is one or more kinds selected from alumina, a titanium oxide, silica, a zinc oxide and magnesia. This inorganic filler is contained aiming at enhancing rigidity of the black heat resistant light shading film, and providing matting effect, and further has light scattering effect by generation of fine surface unevenness at the end face in punching processing. Therefore, low reflectivity and low surface glossiness can be expressed not only at the film surface but also at the end face after punching processing.

Average particle diameter of the inorganic filler is desirably 10 μm or less, in particular, 5 μm or less, and further 1 μm or less. The average particle diameter larger than 10 μm lowers light shading performance, although decreases surface glossiness, and thus is not preferable. However, too small average particle diameter such as below 0.01 μm increases condensation, and thus is not preferable.

Content of the inorganic filler differs depending on average particle diameter, kind of inorganic filler, kind of a resin (components or thickness) or the like, however, it is preferably 2 to 25 parts by weight, further preferably 5 to 20 parts by weight and particularly preferably 8 to 15 parts by weight, relative to the heat resistant resin (a solid content of 100 parts by weight). The content below 2 parts by weight provides high direct reflectance of the film surface, and forms many flat faces at the processed end face, leading to large direct reflection and large surface glossiness, and thus is not preferable. In addition, the content over 25 parts by weight provides high film viscosity, tends to easy generation of surface defect by condensation of the inorganic fillers, leading to inability of manufacturing a film stably, and thus is not preferable.

In addition, a stabilizer, an antioxidant, a plasticizer, an antifog additive, and a lubricant may be contained in the above black film, as appropriate.

(4) Property of the Black Heat Resistant Light Shading Film

The black heat resistant light shading film of the present invention is required to have a surface roughness (arithmetic average height Ra) of said black film of 0.2 to 2.2 μm, preferably 0.3 to 2.1 μm, and particularly 0.5 to 2.0 μm. By forming the above-described surface roughness (arithmetic average height Ra) on said black film, low reflectivity and low surface glossiness of the black heat resistant light shading film can be attained.

Here, arithmetic average height Ra may also be referred to as arithmetic average roughness, and it is an averaged value of sum of absolute deviation values from an average line of a picked up part by standard length from a roughness line in a direction of the average line to a measurement line, by picking up only standard length from a roughness curved line in a direction of the average line. The arithmetic average height Ra smaller than 0.2 μm does not provide sufficiently low reflectivity or low surface glossiness to a surface. In addition, the arithmetic average height Ra over 2.2 μm increases unevenness of the film surface, which deteriorates yield of a film caused by easy generation of holes or wrinkles and further fracture of the film by matting processing, in the case of a thin film, and thus is not preferable.

In addition, it is necessary that an average optical density, which is an index of light shading performance of light, is 3.5 or higher. Further, it is preferable that an average optical density, which is an index of light shading performance, is 4.0 or higher. In addition, it is characterized in that an average direct reflectance of the film surface in a wavelength range of 380 to 780 nm is 0.40% or less. The average direct reflectance is preferably 0.38% or lower, and more preferably 0.35% or lower.

In addition, in the black heat resistant light shading film of the present invention, color lightness (hereafter represented as L*) is preferably 25 to 40, and more preferably 35 or lower. Here, the L* value represents lightness (white and blackness) shown by the CIE (International Commission on Illumination) color system, and is determined from spectroscopic direct reflectance in a visible light region, by an L*a*b* color system (JIS Z 8729), standardized by CIE, and the smaller L* value means the higher blackness. The L* value can be adjusted by content of the black pigment. In the case where the L* value of the black heat resistant light shading film is set at below 25, content of the black pigment becomes over 22 parts by weight, relative to the heat resistant resin (a solid content of 100 parts by weight), therefore film viscosity increases, which does not provide uniform dispersion of the black pigment, and a good film surface state, thus generates variation in arithmetic average height, direct reflectance, average optical density and surface glossiness. In addition, in the case where the L* value is over 40, content of the black pigment becomes below 5 parts by weight, relative to the heat resistant resin (a solid content of 100 parts by weight), which does not provide complete light shading performance, increases average direct reflectance in a wavelength of 380 to 780 nm over 0.40%, and further increases surface glossiness to higher than 8, and thus is not preferable.

In addition, since a fixed diaphragm or a diaphragm blade obtained by punching processing of said black heat resistant light shading film has black color at the obtained processed end face part or contains the inorganic filler, the stray light injected at the end face is absorbed or scattered, and thus direct reflection and surface glossiness at the end face can be prevented, and when it is used as a fixed diaphragm of a digital photographing device or a shutter blade of a mechanical shutter apparatus, or a blade material of a light intensity adjusting apparatus of a liquid crystal projector, appearance of stray light generating by reflected light in the optical system can be avoided.

Here, surface glossiness of the processed end face is judged to have high surface glossiness, in the case where the end face looks white when light is incident, whereas judged low surface glossiness, when the processed end face looks black. Judgment of the surface glossiness of the end face may be performed by direct visual observation of the processed end face under a microscope, or by viewing a recording medium such as a photograph or the like.

2. A Production Method for the Black Heat Resistant Light Shading Film

The black heat resistant light shading film of the present invention is the one formed as a black film, using one or more kinds of heat resistant resins selected from polyimide, polyamideimide, polyphenylene sulfide, polyethylene naphthalate, aramide, polyether ether ketone and polyether sulfone having a heat resistance of 155° C. or higher, and at least the above black pigment and further the inorganic filler as raw materials. In addition, a stabilizer, an antioxidant, a plasticizer, an antifog additive, and a lubricant may be contained in the above black film, as appropriate.

Mixing of the above heat resistant resin with the black pigment and the inorganic filler is performed by mixing under stirring the black pigment and the inorganic filler in a heat resistant resin solution containing a solvent, using a usual stirring mixer, for example, a Henschel mixer, or a Banbury mixer, a roll mill or the like, and kneading to obtain a mixed solution. As a solvent, various alcohols; an ether-type solvent such as tetrahydrofran, diglyme; an amide-type solvent such as N-methyl-2-pyrrolidone, N,N'-dimethylactamide; cyclohexane; a ketone-type solvent such as methyl ethyl ketone; and an organic compound such as y-butyrolactone or tetramethylurea may be used, however, the one which can evaporate under a drying condition of from room temperature to 200° C. is preferable.

Next, the obtained above mixed solution is coated on a supporting substance by an arbitrary method, in air, the mixed solution is solidified at constant temperature, and peeled from a supporting substance to form a film. By removing the solvent at the subsequent drying step, a black film is obtained, which eventually has a film thickness of 5 to 25 μm. Here, as the supporting substance, a plastic film of polyethylene terephthalate or the like, non-woven fabric, a drum or the like may be used, and in particular, the one where surface thereof is roughened is preferable.

As a coating method, a known coating method such as a die coater, a doctor blade coater, a gravure coater, a reversed roll coater, and a nozzle coater, or the like may be used, however, it is not especially limited thereto. In addition, coating amount onto an arbitrary supporting substance is adjusted, as appropriate, so as to obtain predetermined film thickness after drying, and after coating, a residual solvent is removed by heat treatment under normal pressure or reduced pressure.

In addition, drying condition may be adjusted, as appropriate, in a heating period of 30 to 120 minutes, and a heating temperature of 120 to 300° C., so that a solvent in the mixed solution is removed by heating, and a film with uniform thickness distribution can be obtained.

In order to obtain the black heat resistant light shading film of the present invention, next step is to form fine unevenness at the both surfaces of this black film to express low reflectivity and low surface glossiness at the both surfaces of said black film.

Specifically, by matting processing using, for example, a shot material, predetermined surface unevenness is formed at the both surfaces of the black film. Other than this, nano-imprinting processing can also be used. In the case of matting processing, it is general to use silica sand, alumina, ceramic beads or glass beads as the shot material, however, the shot material is not especially limited thereto. Average particle diameter of the shot material can be set, for example, at 50 to 300 μm.

As a method for matting processing, a method called shot blast and air blast may be adopted. A shot blast method is a method for sending the shot material to a blade rotating in high speed to jet the shot material and hit onto a film, and it forms surface unevenness by conveying the film at a constant conveying speed.

An apparatus for jetting the shot material may be a single set or a plurality of sets. In addition, the air blast method is a method for injecting the shot material by using compressed air or a blower fan. In the present invention, the method is not especially limited thereto, as long as the black heat resistant light shading film has predetermined arithmetic average height Ra and surface glossiness and a sound film appearance is attained.

Size of surface unevennesses formed on the black heat resistant light shading film depends on film conveying speed during matting processing, number of conveying, and size and injection pressure of the shot material. In the present invention, it is important to perform surface treatment so that surface roughness of the black heat resistant light shading film attains the arithmetic average height Ra of 0.2 to 2.2 μm, by optimizing these conditions. In the case of using silica sand, with an average particle diameter of, for example, 100 μm, as the shot material, it is possible to set the film conveying speed at 3 to 8 m/minute, the number of conveying at 1 to 3 times, and the injection pressure at 10 to 30 kg/cm².

After the matting processing, a film is washed with water to remove the shot material, and then dried. Washing and drying conditions are not especially limited, however, for example, it is preferable that washing with water is performed for 1 to 5 minutes, and drying is performed at 70 to 120° C. for 1 to 3 minutes. In the case of performing matting processing of the both surfaces of a film, after processing one surface, a film is turned inside out to perform similar processing.

In matting processing, it is necessary to adopt such conditions that the arithmetic average height Ra becomes 0.2 to 2.2 μm. Further, such condition is more preferable that provides a fine uneven structure of 0.3 to 2.1 μm, and in particular, 0.5 to 2.0 μm.

3. Applications of the Black Heat Resistant Light Shading Film

The black heat resistant light shading film of the present invention can be utilized as a fixed diaphragm or a mechanical shutter of a digital camera, a cellar camera phone, and digital video camera, diaphragm (iris) that allow passage of only a certain light intensity, and further a diaphragm blade of a diaphragm device (auto-iris) for the light intensity adjusting module of a liquid crystal projector, and also as a heat resistant light shading tape for shading the light injecting to the rear face of the image sensor such as CCD or CMOS or the like.

The black heat resistant light shading film of the present invention is subjected to punching processing as it is to a specific shape, and is applied to a shutter mechanism allowing an adjustment of light intensity, by using as a plurality of diaphragm blades of a diaphragm device (auto-iris) for the light intensity adjusting module, making those diaphragm blades movable, and controlling a diameter of a diaphragm opening. A processed end face after punching processing becomes the one having low surface glossiness, where the processed end face looks black, when light is injected to the end face.

The diaphragm device for the light intensity adjusting module of a liquid crystal projector is always exposed to irradiation heat of a lamp light during use. Therefore, the light intensity adjusting module is useful, which mounts a diaphragm blade superior in heat resistance and light shading performance, manufactured by processing the black heat resistant light shading film of the present invention. In addition, in manufacturing a les unit, also in the case of assembling a fixed diaphragm or a mechanical shutter in a reflow step, use of a fixed diaphragm or a shutter blade obtained by processing the black heat resistant light shading film of the present invention is extremely useful, because characteristics such as light shading performance does not change even under heating environment in the reflow step.

In addition, the black heat resistant light shading film of the present invention is a thin wall film of 25 μm or less, and since characteristics such as light shading performance, low reflectivity, low reflectivity of the processed end face, or low surface glossiness does not change even under heating environment in the reflow step, it is superior in heat resistance and further punching processing. Therefore, it is extremely useful as a diaphragm material for a reflow camera module with a WLCSP structure, corresponding to requirement of compact sizing and low profile of a cellar camera phone or a digital camera or the like.

In a manufacturing method including this reflow step, an image sensor such as CCD or CMOS is mounted at regular intervals, for example, on a wafer (for example, silicon or the like) face, and major parts composing a camera module such as a lens unit etc. such as an infrared ray cutting filter, a lens and a diaphragm, is mounted thereon, to be separated eventually to each camera module by dicing or the like.

As for a diaphragm of a component part of the lens unit, many ring-like diaphragms are formed, which are arranged at regular intervals in the wafer, by punching processing using a mold or laser processing, from a wafer-like black heat resistant light shading film. Since a diaphragm for a camera module in a cellar camera phone or a digital camera has a ring-like shape, in a conventional manufacturing method, in punching processing like the case where each of component parts of a camera module is assembled sequentially, such a method has been adopted that a ring-like diaphragm is dropped from a sheet, and then pick it up. On the contrary, in a manufacturing method including the reflow step, only unnecessary parts are dropped from the wafer to process each diaphragm so as to become a continuously connected shape in the wafer, by a lead having a certain width. Therefore, the obtained wafer-like diaphragm is combined, for example, with a wafer formed with many heat resistant lenses, and at the same time, mounted on the wafer mounted with an image sensor, and then dicing may be performed to each camera module.

Further, since a fixed diaphragm in the lens unit of the in-vehicle video camera monitor is also exposed to high temperature environment such as the sun light in summer, it is useful to apply a fixed diaphragm manufactured from the black heat resistant light shading film of the present invention, by similar reason.

In addition, the black heat resistant light shading film of the present invention can be converted to a heat resistant light shading tape or sheet, by installing an adhesive layer at one or both surfaces thereof.

A pressure sensitive adhesive for forming the adhesive layer is not especially limited, and a pressure sensitive adhesive suitable for use environment such as temperature and humidity can be selected from those conventionally used for a pressure sensitive sheet.

As a general pressure sensitive adhesive, an acrylic pressure sensitive adhesive, a rubber pressure sensitive adhesive, a polyurethane pressure sensitive adhesive, a polyester pressure sensitive adhesive, or a silicone pressure sensitive adhesive can be used. In particular, in the case of assembling the lens unit of a cellar phone by the reflow step, since heat resistance is required, the acrylic pressure sensitive adhesive or the silicone-type pressure sensitive adhesive having high heat resistance is preferable.

In addition, in order to form the adhesive layer in the black heat resistant light shading film, for example, it can be performed by a conventionally known method, for example, a bar code method, a roll coat method, a gravure coat method, an air doctor coat method, a doctor blade method, a lamination method or the like.

In a compact-sized and thin-wall digital camera or a cellar camera phone, component parts to be mounted use also the compact-sized and thin-wall one. As described above, in the case where an image sensor such as CCD or CMOS, or FPC mounted with the image sensor has thin-wall, leakage of light from the front face of the image sensor, or light transmitting through the FPC makes a ghost image of a printed circuit of the FPC in a photographing area, which deteriorates quality of an image. Since the heat resistant light shading tape installed with the adhesive layer at one or both surfaces of the black heat resistant light shading film of the present invention can be adhered at the peripheral part of the rear face side of the image sensor such as CCD or CMOS, by the adhesive layer, light injected to the rear face side of the image sensor such as CCD or CMOS can be shaded.

EXAMPLES

Next, the present invention will be specifically explained by means of Examples and Comparative Examples. It should be noted that evaluation of the obtained black heat resistant light shading film was performed by the following methods.
(Average Direct Reflectance and Parallel Light Transmittance Of the Black Heat Resistant Light Shading Film)

The obtained black heat resistant light shading film was subjected to measurement of average direct reflectance and parallel light transmittance in a wavelength of 380 to 780 nm using a spectrometer (V-570, manufactured by JASCO Corp.) to calculate average optical density (represented as OD) from parallel light transmittance (T), according to the following equation.

$$OD = \log(100/T)$$

Direct reflectance of light of the black heat resistant light shading film means reflectance of light reflecting from a surface in an angle equal to an incidence angle of an incident light, according to a reflection rule, and average direct reflectance means arithmetic average value of the direct reflectance in the above wavelength. Measurement was performed under the incident angle of 5 degree. In addition, parallel light transmittance means a parallel component of light beam transmitting through a black coated film, and represented by the following equation.

$$T(\%) = (I/I_0) \times 100$$

(wherein T represents parallel light transmittance represented in percent, $I_0$ represents intensity of parallel irradiation light injected to a sample, and I represents intensity of transmitted light of a component parallel to the above irradiation light in light transmitted a sample.)

(Surface Roughness of the Black Heat Resistant Light Shading Film)

Surface roughness of the obtained black heat resistant light shading film was measured, as arithmetic average height Ra, using a surface roughness meter (SURECOM 570A, manufactured by Tokyo Seimitsu Co., Ltd.).
(Surface Glossiness, Color Lightness L* Value of the Black Heat Resistant Light Shading Film)

Surface glossiness of the obtained black heat resistant light shading film was measured under a light incidence angle of 60 degree, using a colorimeter (trade name, Spectroguide, manufactured by BYK-Gardner GmbH). In addition, L* value showing lightness of a film was also measured, in accordance with an L*a*b* color system (JIS Z 8729), standardized by CIE (International Commission on Illumination), similarly as in surface glossiness, using the above colorimeter, under condition of a light source of D65 and a view angle of 10 degree.
(Reflection at the End Face and Surface Gloss Observation after Processing)

The black heat resistant light shading film was punched using a press mold to observe reflection at the end face after processing. Reflection of light and degree of surface glossiness were observed using a metal microscope (ECLIPSE ME 600, manufactured by Nikon Corp.) at observation magnification of 50-fold magnification, by injecting the light onto its end face. As for evaluation, in the case where reflection or surface glossiness is strong, it was marked x, whereas in the case where it is weak or does not exist, it was marked o.
(Heat Resistance of the Black Heat Resistant Light Shading Film)

As for heat resistance of the black heat resistant light shading film, after performing heat treatment in an oven in air at 155° C., 200° C. and 270° C. for 30 minutes, presence or absence of change of average direct reflectance, average optical density, surface glossiness and lightness of the film were evaluated.

Example 1

Methyl ethyl ketone was added to a polyamideimide resin, as a solvent, and 12.0 parts by weight of carbon black (trade name: #7100F, having an average particle diameter of 0.05 μm, produced by Tokai Carbon Co., Ltd.), as the black pigment, and 4.0 parts by weight of silica (trade name: spherical silica, FB-302X, having an average particle diameter of 6.2 μm, produced by Denki Kagaku Kogyo Kabushiki Kaisha), as the inorganic filler, were contained and mixed using a roller mill, relative to 100 parts by weight of a solid part of the resin solution, to prepare a black polyamideimide resin solution. The resin solution was coated on the surface of a polyethylene terephthalate (PET) film of a supporting substance, so as to attain a film thickness after drying under heating of 25 μm using a blade coater, and hardened at room temperature in air. After that, the hardened solution of black polyamideimide resin was peeled from the supporting substance, heated at 150° C. for one hour, and then further dried under heating at 250° C. for 60 minutes to prepare a black polyamideimide film.

In order to passing the above black polyamideimide film through a matting processing apparatus, it was fixed on the polyethylene terephthalate film, and after passing through, using silica sand (average particle diameter: 100 μm), as a shot material, 20 kg/m² of the silica sand was shot, while conveying the film at a rate of 5 m/minute, and then washed it with water for 3 minutes, and dried it at 80° C. for 2 minutes. Next, the film was turned inside out to perform similar matting processing to form uneven surface of arithmetic average height Ra of 0.42 as shown in Table 1-1.

The black heat resistant light shading film after forming the uneven surface has an average direct reflectance in a wavelength of 380 to 780 nm of 0.24%, and a surface glossiness of 5. Average optical density attained 4.0 or higher, thus had complete light shading performance. In addition, L* value showing lightness of the film is 30, and thus it was found to have high blackness.

The prepared black heat resistant light shading film was subjected to punching processing to observe reflection degree at its end face using a metal microscope, it showed weak reflection or surface glossiness of the end face and had a good state. Observation result of the end face with SEM (Scanning Electron Microscope) or EPMA (Electron Probe X-ray Micro Analyzer) showed fine unevenness at the end face, and presence of silica at the uneven portion. It is considered that formation of this fine unevenness reduced the end face reflection or surface glossiness.

In addition, as a result of heat treatment in air at 155° C., 200° C. and 270° C. for 30 minutes, there was no change of average direct reflectance, average optical density and lightness, in a wavelength of 380 to 780 nm, at each temperature, as compared with the state before heat treatment. In addition, there was no change of surface glossiness and lightness as well, as compared with the state before heat treatment.

Accordingly, the black polyamideimide film of Example 1 is good as for average optical density, average direct reflectance, surface glossiness, lightness, as well as reflectivity at the end face after punching processing or surface glossiness, and heat resistance, and thus such a black heat resistant light shading film can be utilized as a material such as a fixed diaphragm to be used in a lens unit to be used under high temperature environment, a shutter blade or a diaphragm of a liquid crystal projector or the like.

Examples 2 to 4

A black polyamideimide films were prepared using similar kind and content of the black pigment and the inorganic filler, and a film preparation method as in Example 1, except that film conveying speed in matting processing and arithmetic average height Ra of the both surfaces of the film were changed. Arithmetic average height Ra of the film was 0.20 µm (Example 2), 1.02 µm (Example 3), and 2.20 µm (Example 4), as shown in Table 1-1.

Average direct reflectance in a wavelength of 380 to 780 nm of 0.24, average optical density and a surface glossiness of the black polyamideimide film after forming uneven surface were measured, and similar results as in Example 1 were obtained, as shown in Table 1-2. In addition, lightness L* value of the film was also similar to Example 1, as shown in Table 1-2 and it was found to have high blackness.

In addition, similar to Example 1, punching processing was performed to observe reflection degree at its end face using a metal microscope, it showed weak reflection or surface glossiness of the end face, similarly as in Example 1, and thus had a good state. Observation result of the end face with SEM (Scanning Electron Microscope) or EPMA (Electron Probe X-ray Micro Analyzer) showed, similarly as in Example 1, fine unevenness at the end face, and presence of silica at the uneven parts. In addition, after heat treatment at 155° C., 200° C. and 270° C., there was no change of average direct reflectance, average optical density and L* value of the film, as compared with the state before heat treatment.

Accordingly, the black polyamideimide films of Examples 2 to 4 are good as for average optical density, average direct reflectance, surface glossiness, lightness, reflectivity at the end face after punching processing or surface glossiness and heat resistance, and thus such a black heat resistant light shading film can be utilized as a material such as a fixed diaphragm to be used in a lens unit to be used under high temperature environment, a shutter blade or a diaphragm of a liquid crystal projector.

Comparative Example 1

A film was prepared using similar kind and content of the black pigment and the inorganic filler, as in Example 1, except that film conveying speed in matting processing was changed and arithmetic average height Ra of the both surfaces of the film was changed to 2.3 µm as shown in Table 1-1. Average direct reflectance in a wavelength of 380 to 780 nm, and average optical density, surface glossiness, and lightness L* value of the black polyamideimide film after forming uneven surface were measured, and similar results as in Example 1 were obtained, as shown in Table 1-2. However, since conveying speed in matting processing was slowed extremely to increase arithmetic average height Ra of the film, many fine pores were generated in the film, therefore a good film was not obtained.

In addition, as for the parts where pores were not formed in matting processing, punching processing was performed to observe reflection at its end face using a metal microscope, and it showed weak reflection or surface glossiness of the end face, similarly as in Example 1, and thus had a good state. Observation result of the end face with SEM (Scanning Electron Microscope) or EPMA (Electron Probe X-ray Micro Analyzer) showed fine unevenness at the end face, and it was found presence of silica at the uneven portion.

Accordingly, although the black polyamideimide film of Comparative Example 1 was good as for average optical density in a wavelength of 380 to 780 nm, average direct reflectance, surface glossiness, lightness, and reflectivity at the end face after punching processing or surface glossiness, a good film was not obtained. in view of appearance, therefore, it cannot be utilized as a material such as a fixed diaphragm to be used in a lens unit, a shutter blade, a diaphragm of a liquid crystal projector or the like.

Comparative Example 2

A film was prepared using similar kind and content of the black pigment and the inorganic filler, as in Example 1, except that film conveying speed in matting processing was changed and arithmetic average height Ra of the both surfaces of the film were changed to 0.1 µm. Average direct reflectance in a wavelength of 380 to 780 nm, average optical density, surface glossiness and lightness L* value of the black polyamideimide film after forming uneven surface were measured, and as shown in Table 1-2, and as for average optical density and L* value, similar results as in Example 1 were obtained, however, average direct reflectance in a wavelength of 380 to 780 nm was 0.70% and surface glossiness was 10, higher than Example 1.

After heat treatment at 155° C., 200° C. and 270° C., there was no change of average direct reflectance, average optical density and lightness, as compared with the state before heat treatment.

In addition, punching processing was performed to observe reflection at its end face using a metal microscope, and it showed weak reflection or surface glossiness of the end face, similarly as in Example 1, and thus had a good state. Observation result of the end face with SEM (Scanning Electron Microscope) or EPMA (Electron Probe X-ray Micro Analyzer) showed fine unevenness at the end face, and presence of silica at the uneven portion. Accordingly, although the black polyamideimide film of Comparative Example 2 was good as for average optical density, lightness of the film, in a wavelength of 380 to 780 nm, as well as reflectivity at the end face after punching processing or surface gross property, heat resistance, average direct reflectance and surface gross degree were higher as compared with Examples 1 to 4, and reflected light at the film surface adversely influences on picture image property, therefore it cannot be utilized as a member such as a fixed diaphragm used in a lens unit, a shutter blade, a diaphragm of a liquid crystal projector or the like.

Examples 5 and 6

Films were prepared using similar kind and content of the black pigment and the inorganic filler, a film preparation method and matting processing as in Example 1, except that thickness of the black polyamideimide film was changed to 1.2 μm (Example 5) and 6 μm (Example 6).

Arithmetic average height Ra of the both surfaces of the film after forming uneven surface was 0.34 μm (Example 5) and 0.44 μm (Example 6), as shown in Table 1-1.

Average direct reflectance in a wavelength of 380 to 780 nm of 0.24, average optical density and a surface glossiness of the black polyamideimide film after forming uneven surface were measured, and similar results as in Example 1 were obtained, as shown in Table 1-2. In addition, lightness L* value of the film was also similar to Example 1, as shown in Table 1-2, and it was found to have high blackness. Reflectivity at the end face after punching processing was observed using a metal microscope, and the results showed weak reflection or surface gloss of the end face, similarly as in Example 1, and thus had a good state. Observation result of the end face with SEM (Scanning Electron Microscope) or EPMA (Electron Probe X-ray Micro Analyzer) showed fine unevenness at the end face, and presence of silica at the uneven portion.

In addition, after heat treatment at 155° C., 200° C. and 270° C., there was no change of average direct reflectance, average optical density and lightness of the film, as compared with the state before heat treatment.

Accordingly, the black polyamideimide films of Examples 5 to 6 are good as for average optical density, average direct reflectance, surface glossiness, lightness, and reflectivity at the end face after punching processing or surface glossiness, and heat resistance, and thus such a black heat resistant light shading film can be utilized as a material such as a fixed diaphragm in a lens unit to be used under high temperature environment, a shutter blade or a diaphragm of a liquid crystal projector or the like.

Comparative Examples 3 and 4

Examples 7 to 9

Film ware prepared using similar kind and content of the black pigment and the inorganic filler, film thickness, a film preparation method and matting processing as in Example 1, except that content of carbon black of the black pigment was changed to 4.0 parts by weight (Comparative Example 3), 5.0 parts by weight (Example 7), 15.0 parts by weight (Example 8), 22.0 parts by weight (Example 9), 23.0 parts by weight (Comparative Example 4).

Arithmetic average height Ra of the both surfaces of black polyamideimide films after forming uneven surface was 0.35 μm (Comparative Example 3), 0.46 μm (Example 7), 0.46 μm (Example 8), 0.46 μm (Example 9) and 0.57 μm (Comparative Example 4), as shown in Table 1-1.

In addition, average direct reflectance in a wavelength of 380 to 780 nm, average optical density and a surface glossiness were measured, and as for Comparative Example 4 and Examples 8 and 9, similar results as in Example 1 were obtained, as shown in Table 1-2, and L* value showing lightness of the film was also similar to Example 1, as shown in Table 1-2, and it was found to have high blackness. However, in Comparative Example 3 and Example 7, although average direct reflectance in a wavelength of 380 to 780 nm was equivalent to that in Example 1, average optical density in Comparative Example 3 was 2.9, while 3.5 in Example 7, showing no complete light shading performance. In addition, Comparative Example 3 had higher lightness L*value as compared with Example 1, showing lower blackness. It is considered that lower content of carbon black provided lower light shading performance. On the other hand, in Comparative Example 4, because of high content of carbon black, carbon black was not dispersed uniformly. Therefore, characteristics such as uneven surface, average optical density, average direct reflectance, and a surface glossiness showed non-uniform, and thus a good film was not obtained.

As for Comparative Example 3 and Examples 7 to 9, punching processing was performed to observe reflection degree at its end face using a metal microscope, and it showed weak reflection or surface glossiness of the end face, similarly as in films of Examples 7 to 9, and thus had a good state. Observation result of its end face with SEM (Scanning Electron Microscope) or EPMA (Electron Probe X-ray Micro Analyzer) showed, fine unevenness at the end face, and presence of silica at the uneven portion. However, as for a film of Comparative Example 3, it was found to have strong reflection at the end face and surface glossiness. Although there was found fine unevenness at the end face by investigation with SEM or EPMA, it is considered that light absorption became insufficient and reflected, caused by low content of carbon black.

It should be noted that as for films of Examples 7 to 9, and Comparative Example 3, after heat treatment at 155° C., 200° C. and 270° C., there was no change of average direct reflectance, average optical density and lightness of the films, as compared with the state before heat treatment.

Accordingly, the black polyamideimide films of Examples 8 and 9 are good as for average optical density, average direct reflectance, surface glossiness, lightness, as well as reflectivity at the end face after punching processing or surface glossiness, and heat resistance, and thus such a black heat resistant light shading film can be utilized as a material such as a fixed diaphragm to be used in a lens unit under high temperature environment, a shutter blade or a diaphragm of a liquid crystal projector or the like. As for a film of Example 7, although average optical density was a little low of 3.5, it can be utilized limitedly for a part not requiring complete light shading performance such as an average optical density of 4.0 or higher, in the lens unit. However, a film of Comparative Example 3 having extremely low average optical density and strong reflection at the end face or surface glossiness, or a film of Comparative Example 4 not providing good film appearance, it cannot be utilized as a material such as a fixed diaphragm, a shutter blade, a diaphragm of a liquid crystal projector or the like.

Comparative Example 5

A black polyamideimide film was prepared by performing matting processing so as to attain similar film thickness, type and content of the inorganic filler, as in Example 1, except that the black pigment was not contained in film preparation step.

Arithmetic average height Ra of the both surfaces of the film after forming uneven surface was 0.44 µm, as shown in Table 1-1. The obtained black polyamideimide film had an average direct reflectance in a wavelength of 380 to 780 nm of 0.45% and a surface glossiness of 10. In addition, average optical density was 0.3, showing high light transmission. Film lightness L* was 50, showing low blackness.

Punching processing was performed to observe reflection degree at its end face using a metal microscope, showing strong reflection or surface glossiness of the end face. Observation result of the end face with SEM (Scanning Electron Microscope) or EPMA (Electron Probe X-ray Micro Analyzer) showed, fine unevenness at the end face, and presence of silica at the uneven portion. However, because of absence of carbon black for absorbing the light, it is considered that reflection at the end face or surface glossiness became strong. In addition, after heat treatment at 155° C., 200° C. and 270° C., there was no change of average direct reflectance, average optical density and lightness of the films, as compared with the state before heat treatment.

Accordingly, the polyamideimide film of Comparative Example 5 was good in heat resistance, however, it had lower average optical density, higher average direct reflectance and surface glossiness, as well as lower blackness, as compared with the black polyamideimide film of Example 1. Accordingly, it cannot be utilized as a material such as a fixed diaphragm used in a lens unit, a shutter blade, a diaphragm of a liquid crystal projector or the like.

Examples 10 and 11, and Comparative Examples 6 and 7

Films were prepared using similar kind and content of the black pigment, kind of the inorganic filler, film thickness, a film preparation method and matting processing as in Example 1, except that content of the inorganic filler was changed to 2.0 parts by weight (Example 10), 25.0 parts by weight (Example 11), 1.0 part by weight (Comparative Example 6), and 26.0 parts by weight (Comparative Example 7).

Arithmetic average height Ra of the both surfaces of black polyamideimide films after forming uneven surface was 0.43 µm (Example 10), 0.54 µm (Example 11), 0.44 µm (Comparative Example 6), and 0.44 µm (Comparative Example 7), as shown in Table 1-1.

In addition, average direct reflectance in a wavelength of 380 to 780 nm, average optical density, a surface glossiness and lightness L* value were measured, and as for Examples 10 and 11 and Comparative Example 7, similar results as in Example 1 were obtained, as shown in Table 1-2. However, in Comparative Example 6, due to low content of silica, as a matting material, surface glossiness and average direct reflectance were higher as compared with Example 1, as shown in Table 1-2. On the other hand, in Comparative Example 7, cross-sectional observation with SEM showed poor dispersion in a film due to high content of silica, causing condensation and thus good film appearance was not obtained.

As for films of Example 10 and 11, and Comparative Examples 6, punching processing was performed to observe reflection degree at its end face using a metal microscope, and it showed weak reflection at the end face or surface glossiness, similarly as in Example 1, and thus had a good state. Observation result of the end face with SEM (Scanning Electron Microscope) or EPMA (Electron Probe X-ray Micro Analyzer) showed, fine unevenness at the end face, and presence of silica at the uneven portion. However, in Comparative Example 6, it was found that there was no fine unevenness at the end face, and there were many flat faces, which gave strong reflection at the end face or surface glossiness. It was caused by too low content of silica which has matting effect.

It should be noted that as for films of Examples 10 and 11, and Comparative Example 6, there was no change of average direct reflectance, average optical density and lightness of the films, after heat treatment, as compared with the state before heat treatment.

Accordingly, the black polyamideimide films of Examples 10 and 11 are good as for average optical density, average direct reflectance, surface glossiness, lightness, as well as reflectivity at the end face after punching processing or surface glossiness, and heat resistance, and thus such a black heat resistant light shading film can be utilized as a material such as a fixed diaphragm to be used in a lens unit to be used under high temperature environment, a shutter blade or a diaphragm of a liquid crystal projector or the like. However, as for a film of Comparative Example 6, having high reflection at the surface and the end face, as well as high surface glossiness, and a film of Comparative Example 7, not providing good film appearance, cannot be utilized as a diaphragm material.

Example 12

A film was prepared using similar kind and thickness of a film, kind and content of the black pigment, content of the inorganic filler, a film preparation method and matting processing as in Example 1, except that alumina was used as the inorganic filler.

Arithmetic average height Ra of the both surfaces of the film matting processing was 0.46 µm, as shown in Table 1-1.

As for the black polyamideimide film after forming uneven surface, average direct reflectance in a wavelength of 380 to 780 nm, average optical density, and surface glossiness were measured, showing similar results as in Example 1. In addition, film lightness L* value was also shown to be equivalent to that in Example 1, as shown in Table 1-2, showing high black degree. In addition, punching processing was performed, similarly as in Example 1, to observe reflection degree at its end face using a metal microscope, and it showed weak reflection at the end face or surface gloss, similarly as in Example 1, and thus had a good state. Observation result of the end face with SEM (Scanning Electron Microscope) or EPMA (Electron Probe X-ray Micro Analyzer) showed fine unevenness at the end face, and presence of alumina at the uneven portion. It is considered that formation of this fine unevenness reduced reflection at the end face or surface glossiness.

In addition, there was no change of average direct reflectance, average optical density and L* value of the films, after heat treatment, as compared with the state before heat treatment.

Accordingly, the black polyamideimide film of Example 12 is good as for average optical density, average direct reflectance, surface gross degree, lightness, as well as reflectivity at the end face after punching processing or surface gross property, and heat resistance, and thus such a black heat resistant light shading film can be utilized as a member such as a fixed diaphragm to be used in a lens unit under high temperature environment, a shutter blade or a diaphragm of a liquid crystal projector or the like.

Example 13

A film was prepared using similar kind and thickness of a film, similar kind and content of the black pigment, content of the inorganic filler, a film preparation method and matting processing as in Example 1, except that titanium oxide (grade HT0210, with an average particle diameter of 2.3 μm, produced by Toho Titanium Co., Ltd.) was used.

Arithmetic average height Ra of the both surfaces of the film matting processing was 0.43 μm, as shown in Table 1-1.

As for the black polyamideimide film after forming uneven surface, average direct reflectance in a wavelength of 380 to 780 nm, average optical density, and surface glossiness were measured, showing similar results as in Example 1. In addition, film lightness L* value was also shown to be equivalent to that in Example 1, as shown in Table 1-2, showing high black degree. In addition, punching processing was performed, similarly as in Example 1, to observe reflection degree at its end face using a metal microscope, and it showed weak reflection at the end face or surface glossiness, similarly as in Example 1, and thus had a good state. Observation result of the end face with SEM (Scanning Electron Microscope) or EPMA (Electron Probe X-ray Micro Analyzer) showed fine unevenness at the end face, and presence of titanium oxide at the uneven portion. It is considered that formation of this fine unevenness reduced reflection at the end face or surface glossiness.

In addition, there was no change of average direct reflectance, average optical density and film L* value, after heat treatment, as compared with the state before heat treatment.

Accordingly, the black polyamideimide films of Example 13 is good as for average optical density, average direct reflectance, surface glossiness, lightness, as well as reflectivity at the end face after punching processing or surface glossiness and heat resistance, and thus such a black heat resistant light shading film can be utilized as a material such as a fixed diaphragm to be used in a lens unit under high temperature environment, a shutter blade or a diaphragm of a liquid crystal projector or the like.

Example 14

A film was prepared using similar kind of a film, thickness, similar kind and content of the black pigment, content of the inorganic filler, a film preparation method and matting processing as in Example 1, except that titanium black (product name, 13M-C, produced by Jemco Co., Ltd.) was used.

Arithmetic average height Ra of the both surfaces of the film matting processing was 0.44 μm, as shown in Table 1-1.

As for the black polyamideimide film after forming uneven surface, average direct reflectance in a wavelength of 380 to 780 nm, average optical density, and surface glossiness were measured, showing similar results as in Example 1. In addition, film lightness L* value was also shown to be equivalent to that in Example 1, as shown in Table 1-2, showing high black degree.

In addition, punching processing was performed, similarly as in Example 1, to observe reflection degree at its end face using a metal microscope, and it showed weak reflection at the end face or surface glossiness, similarly as in Example 1, and thus had a good state. Observation result of its end face with SEM (Scanning Electron Microscope) or EPMA (Electron Probe X-ray Micro Analyzer) showed fine unevenness at the end face, and presence of silica at the uneven portion. It is considered that formation of this fine unevenness reduced reflection at the end face or surface glossiness.

In addition, there was no change of average direct reflectance, average optical density and film L* value, after heat treatment, as compared with the state before heat treatment.

Accordingly, the black polyamideimide films of Example 14 is good as for average optical density, average direct reflectance, surface glossiness, lightness, as well as reflectivity at the end face after punching processing or surface glossiness, and heat resistance, and thus such a black heat resistant light shading film can be utilized as a material such as a fixed diaphragm to be used in a lens unit under high temperature environment, a shutter blade or a diaphragm of a liquid crystal projector or the like.

Example 15

A film was prepared using similar kind and thickness of a film, similar kind and content of the black pigment, content of the inorganic filler, a film preparation method and matting processing as in Example 1, except that aniline black (No. 2 Super black, Pigment Black 1, produced by Tokyo Shikizai Industry Co., Ltd.) was used as the black pigment.

Arithmetic average height Ra of the both surfaces of the film matting processing was 0.46 μm, as shown in Table 1-1.

As for the black polyamideimide film after forming uneven surface, average direct reflectance in a wavelength of 380 to 780 nm, average optical density, and surface glossiness were measured, showing similar results as in Example 1. In addition, film lightness L* value was also shown to be equivalent to that in Example 1, as shown in Table 1-2, showing high black degree.

In addition, punching processing was performed, similarly as in Example 1, to observe reflection degree at its end face using a metal microscope, and it showed weak reflection at the end face or surface glossiness, similarly as in Example 1, and thus had a good state. Observation result of the end face with SEM (Scanning Electron Microscope) or EPMA (Electron Probe X-ray Micro Analyzer) showed fine unevenness at the end face, and presence of silica at the uneven portion.

There was no change of average direct reflectance, average optical density and film L* value, after heat treatment, as compared with the state before heat treatment.

Accordingly, the black polyamideimide films of Example 15 is good as for average optical density, average direct reflectance, surface glossiness, lightness, as well as reflectivity at the end face after punching processing or surface glossiness, and heat resistance, and thus such a black heat resistant light shading film can be utilized as a material such as a fixed diaphragm to be used in a lens unit under high temperature environment, a shutter blade or a diaphragm of a liquid crystal projector or the like.

TABLE 1-1

| Example | Kind of heat resistant resin | Black pigment | | Inorganic filler | | Film thickness (μm) | Arithmatic average height Ra (μm) |
|---|---|---|---|---|---|---|---|
| | | Kind | Content (parts by wt) | Kind | Content (parts by wt) | | |
| Example 1 | Polyamideimide | Carbon black | 12.0 | Silica | 4.0 | 25 | 0.42 |
| Example 2 | | | 12.0 | | 4.0 | 25 | 0.20 |
| Example 3 | | | 12.0 | | 4.0 | 25 | 1.02 |
| Example 4 | | | 12.0 | | 4.0 | 25 | 2.20 |

TABLE 1-1-continued

| Example | Kind of heat resistant resin | Black pigment Kind | Black pigment Content (parts by wt) | Inorganic filler Kind | Inorganic filler Content (parts by wt) | Film thickness (μm) | Arithmatic average height Ra (μm) |
|---|---|---|---|---|---|---|---|
| Comparable Example 1 | | | 12.0 | | 4.0 | 25 | 2.30 |
| Comparable Example 2 | | | 12.0 | | 4.0 | 25 | 0.10 |
| Example 5 | | | 12.0 | | 4.0 | 12.5 | 0.34 |
| Example 6 | | | 12.0 | | 4.0 | 6 | 0.44 |
| Comparable Example 3 | | | 4.0 | | 4.0 | 25 | 0.35 |
| Example 7 | | | 5.0 | | 4.0 | 25 | 0.46 |
| Example 8 | | | 15.0 | | 4.0 | 25 | 0.46 |
| Example 9 | | | 22.0 | | 4.0 | 25 | 0.46 |
| Comparable Example 4 | | | 23.0 | | 4.0 | 25 | 0.57 |
| Comparable Example 5 | | — | 0.0 | | 4.0 | 25 | 0.44 |
| Example 10 | | Carbon black | 12.0 | | 2.0 | 25 | 0.43 |
| Example 11 | | | 12.0 | | 25.0 | 25 | 0.54 |
| Comparable Example 6 | | | 12.0 | | 1.0 | 25 | 0.44 |
| Comparable Example 7 | | | 12.0 | | 26.0 | 25 | 0.44 |
| Example 12 | | | 12.0 | Alumina | 4.0 | 25 | 0.46 |
| Example 13 | | | 12.0 | Titanium oxide | 4.0 | 25 | 0.43 |
| Example 14 | | Titanium black | 12.0 | Silica | 4.0 | 25 | 0.44 |
| Example 15 | | Aniline black | 12.0 | | 4.0 | 25 | 0.46 |

TABLE 1-2

| Example | Average direct reflectance in wavelength of 380 to 780 nm (%) | Average optical density in wavelength of 380 to 780 nm (%) | Lightness L* | Surface glossiness | Reflection at the end face and surface glossiness | Change in heating at 155° C. in air for 30 minutes Average direct reflectance | Change in heating at 155° C. in air for 30 minutes Average optical density | Change in heating at 155° C. in air for 30 minutes Lightness L* | Change in heating at 200° C. in air for 30 minutes Average direct reflectance | Change in heating at 200° C. in air for 30 minutes Average optical density | Change in heating at 200° C. in air for 30 minutes Lightness L* | Change in heating at 270° C. in air for 30 minutes Average direct reflectance | Change in heating at 270° C. in air for 30 minutes Average optical density | Change in heating at 270° C. in air for 30 minutes Lightness L* |
|---|---|---|---|---|---|---|---|---|---|---|---|---|---|---|
| Example 1 | 0.24 | >4.0 | 30 | 5 | ○ | No | No | No | No | No | No | No | No | No |
| Example 2 | 0.39 | >4.0 | 25 | 7 | ○ | No | No | No | No | No | No | No | No | No |
| Example 3 | 0.20 | >4.0 | 28 | 5 | ○ | No | No | No | No | No | No | No | No | No |
| Example 4 | 0.17 | >4.0 | 29 | 4 | ○ | No | No | No | No | No | No | No | No | No |
| Comparable Example 1 | 0.27 | >4.0 | 33 | 4 | ○ | — | — | — | — | — | — | — | — | — |
| Comparable Example 2 | 0.70 | >4.0 | 25 | 10 | ○ | No | No | No | No | No | No | No | No | No |
| Example 5 | 0.20 | >4.0 | 28 | 5 | ○ | No | No | No | No | No | No | No | No | No |
| Example 6 | 0.22 | >4.0 | 31 | 5 | ○ | No | No | No | No | No | No | No | No | No |
| Comparable Example 3 | 0.35 | 2.9 | 42 | 6 | x | No | No | No | No | No | No | No | No | No |
| Example 7 | 0.37 | 3.5 | 31 | 6 | ○ | No | No | No | No | No | No | No | No | No |
| Example 8 | 0.37 | >4.0 | 31 | 6 | ○ | No | No | No | No | No | No | No | No | No |

TABLE 1-2-continued

| Example | Average direct reflectance in wavelength of 380 to 780 nm (%) | Average optical density in wavelength of 380 to 780 nm (%) | Lightness L* | Surface glossiness | Reflection at the end face and surface glossiness | Change in heating at 155° C. in air for 30 minutes | | | Change in heating at 200° C. in air for 30 minutes | | | Change in heating at 270° C. in air for 30 minutes | | |
|---|---|---|---|---|---|---|---|---|---|---|---|---|---|---|
| | | | | | | Average direct reflectance | Average optical density | Lightness L* | Average direct reflectance | Average optical density | Lightness L* | Average direct reflectance | Average optical density | Lightness L* |
| Example 9 | 0.38 | >4.0 | 30 | 6 | ○ | No | No | No | No | No | No | No | No | No |
| Comparable Example 4 | 0.30 | >4.0 | 30 | 5 | ○ | — | — | — | — | — | — | — | — | — |
| Comparable Example 5 | 0.45 | 0.3 | 50 | 10 | x | No | No | No | No | No | No | No | No | No |
| Example 10 | 0.38 | >4.0 | 32 | 6 | ○ | No | No | No | No | No | No | No | No | No |
| Example 11 | 0.21 | >4.0 | 29 | 4 | ○ | No | No | No | No | No | No | No | No | No |
| Comparable Example 6 | 0.41 | >4.0 | 31 | 10 | x | No | No | No | No | No | No | No | No | No |
| Comparable Example 7 | 0.35 | >4.0 | 32 | 5 | — | — | — | — | — | — | — | — | — | — |
| Example 12 | 0.28 | >4.0 | 30 | 5 | ○ | No | No | No | No | No | No | No | No | No |
| Example 13 | 0.25 | >4.0 | 30 | 5 | ○ | No | No | No | No | No | No | No | No | No |
| Example 14 | 0.26 | >4.0 | 31 | 5 | ○ | No | No | No | No | No | No | No | No | No |
| Example 15 | 0.23 | >4.0 | 30 | 5 | ○ | No | No | No | No | No | No | No | No | No |

Example 16

A film was prepared using similar film thickness, similar kind and content of the black pigment and the inorganic filler, a film preparation method and matting processing as in Example 1, except that a raw material of the resin film was changed from a polyamideimide resin to a polyimide resin.

Arithmetic average height Ra of the both surfaces of the film matting processing was 0.21 μm.

As for the black polyimide film after forming uneven surface, average direct reflectance in a wavelength of 380 to 780 nm, average optical density, and surface glossiness were measured, showing similar results as in Example 1, as shown in Table 2-2. In addition, film lightness L* value was also shown to be equivalent to that in Example 1, as shown in Table 2-2, showing high black degree.

In addition, punching processing was performed, similarly as in Example 1, to observe reflection degree at its end face using a metal microscope, and it showed weak reflection at the end face or surface glossiness, similarly as in Example 1, and thus had a good state. Observation result of the end face with SEM (Scanning Electron Microscope) or EPMA (Electron Probe X-ray Micro Analyzer) showed fine unevenness at the end face, and presence of silica at the uneven portion.

In addition, after heat treatment at 155° C., 200° C. and 270° C., there was no change of average direct reflectance, average optical density and lightness L* value of the films, as compared with the state before heat treatment.

Accordingly, the black polyimide films of Example 16 is good as for average optical density, average direct reflectance, surface glossiness, lightness, as well as reflectivity at the end face after punching processing or surface glossiness, and heat resistance, and thus such a black heat resistant light shading film can be utilized as a member such as a fixed diaphragm to be used in a lens unit under high temperature environment, a shutter blade or a diaphragm of a liquid crystal projector or the like.

Examples 17 to 19

Comparative Examples 8 and 9

Films were prepared using similar film type and film thickness, similar kind and content of the black pigment and the inorganic filler, a similar film preparation method, as in Example 16, except that film conveying speed in matting processing and arithmetic average height Ra of the both surfaces of the film were changed to 0.41 μm (Example 17), 1.06 μm (Example 18), 2.20 μm (Example 19), 2.30 μm (Comparative Example 8), and 0.10 μm (Comparative Example 9), as shown in Table 2-1.

As for the black polyimide film after forming uneven surface, average direct reflectance in a wavelength of 380 to 780 nm, average optical density, surface glossiness and lightness L* value were measured, showing similar results as in Example 16, as for Examples 17 to 19 and Comparative Example 8, as shown in Table 2-2. However, Comparative Example 9 had average optical density and lightness L* value equivalent to those of Example 16, as shown in Table 2-2, but had higher average direct reflectance and surface glossiness, as compared with Example 16. In addition, in Comparative Example 8, because conveying speed in matting processing was slowed extremely to increase arithmetic average height Ra of the film, many fine pores generated in the film, therefore a good film was not obtained.

Therefore, although the black polyimide film of Comparative Example 8 was good as for average optical density, average direct reflectance, surface glossiness, lightness of the film in a wavelength of 380 to 780 nm, a good film in view of appearance was not obtained.

In addition, punching processing was performed, similarly as in Example 16, to observe reflection degree at its end face using a metal microscope, and as for Examples 17 to 19 and Comparative Examples 8 and 9, and it showed weak reflection at the end face or surface glossiness, similarly as in Example 16, and thus had a good state. Observation result of the end face with SEM (Scanning Electron Microscope) or EPMA (Electron Probe X-ray Micro Analyzer) showed fine unevenness at the end face, and presence of silica at the uneven portion. It is considered that formation of this fine unevenness reduced reflection at the end face or surface glossiness.

It should be noted that, as for the films of Examples 17 to 19 and Comparative Examples 8 and 9, there was no change of average direct reflectance, average optical density and lightness of the films, after heat treatment, as compared with the state before heat treatment.

Accordingly, the black polyimide film of Examples 17 to 19 are good as for heat resistance, average optical density, average direct reflectance, surface glossiness, as well as reflectivity at the end face after punching processing or surface grossiness, and thus it can be utilized as a material such as a fixed diaphragm to be used in a lens unit, a shutter blade or a diaphragm of a liquid crystal projector or the like.

However, Comparative Example 8, in which a good film was obtained, and Comparative Example 9 having high average direct reflectance and surface glossiness, cannot be utilized as a material such as a fixed diaphragm, a shutter blade, a diaphragm of a liquid crystal projector or the like.

Examples 20 and 21

Films were prepared using similar kind and content of the black pigment and the inorganic filler, a film preparation method and matting processing as in Example 16, except that film thickness of the black polyimide film was changed to 12.5 μm (Example 20) and 7.5 μm (Example 21).

Arithmetic average height Ra of the both surfaces of the film matting processing was 0.33 μm (Example 20) and 0.36 μm (Example 21), as shown in Table 2-1.

As for the obtained black polyimide films, average direct reflectance in a wavelength of 380 to 780 nm, average optical density, and surface glossiness were measured, showing similar results as in Example 14, as shown in Table 2-2. In addition, film lightness L* value was also shown to be equivalent to that in Example 16, as shown in Table 2-2, showing high black degree. In addition, punching processing was performed, similarly as in Example 16, to observe reflection degree at its end face using a metal microscope, and it showed weak reflection at the end face or surface glossiness, and thus had a good state. Observation result of the end face with SEM (Scanning Electron Microscope) or EPMA (Electron Probe X-ray Micro Analyzer) showed fine unevenness at the end face, and presence of silica at the uneven portion. It is considered that formation of this fine unevenness reduced reflection at the end face or surface glossiness.

There was no change of average direct reflectance, average optical density and lightness of the films, after heat treatment, as compared with the state before heat treatment.

Accordingly, the black polyimide films of Examples 20 and 21 are good as for average optical density, average direct reflectance, surface glossiness, lightness, as well as reflectivity at the end face after punching processing or surface glossiness and heat resistance, and thus such black heat resistant light shading films can be utilized as a material such as a fixed diaphragm to be installed in a lens unit to be used under high temperature environment, a shutter blade or a diaphragm of a liquid crystal projector or the like.

Examples 22 to 24

Comparative Examples 10 and 11

Films were prepared using similar kind and thickness of the film, similar kind of the black pigment and similar kind content of the inorganic filler, a film preparation method and matting processing as in Example 16, except that content of the black pigment was changed to 4.0 parts by weight (Comparative Example 10), 5.0 parts by weight (Example 22), 15.0 parts by weight (Example 23), 22.0 parts by weight (Example 24), 23.0 parts by weight (Comparative Example 11).

Arithmetic average height Ra of the both surfaces of the black polyimide films after forming uneven surface was 0.52 μm (Comparative Example 10), 0.44 μm (Example 22), 0.44 μm (Example 23), 0.31 μm (Example 24) and 0.67 μm (Comparative Example 11), as shown in Table 2-1.

In addition, as for the obtained black polyimide films, average direct reflectance in a wavelength of 380 to 780 nm, average optical density, a surface glossiness and lightness L* value were measured, and as for Comparative Example 11 and Examples 23 and 24, similar results as in Example 16 were obtained, as shown in Table 2-2. On the other hand, in Comparative Example 10 and Example 22, although average direct reflectance in a wavelength of 380 to 780 nm was equivalent to that in Example 16, as shown in Table 2-2, average optical density were 2.9 and 3.9, respectively, showing no complete light shading performance. In addition, Comparative Example 10 had higher lightness L*value as compared with Example 16, showing lower blackness.

It is considered that in the film of Comparative Example 10, lower content of carbon black provided lower light shading performance. On the other hand, in the film of Comparative Example 11, because of high content of carbon black, carbon black was not dispersed uniformly. Therefore, characteristics such as uneven surface, average optical density, average direct reflectance, a surface glossiness and lightness showed non-uniform, and thus a good film was not obtained.

In addition, punching processing was performed similarly as in Example 16, to observe reflection degree at its end face using a metal microscope, and as for the films of Examples 22 to 24 and Comparative Example 11, and it showed weak reflection or surface glossiness of the end face, similarly as in Example 16, and thus had a good state. However, the film of Comparative Example 10 showed strong reflection at the end face or surface glossiness. Observation result of the end face with SEM (Scanning Electron Microscope) or EPMA (Electron Probe X-ray Micro Analyzer) showed, fine unevenness at the end face, and presence of silica at the unevenportion. However, it is considered that light absorption became insufficient at the end face, caused by too low content of carbon black. It should be noted that as for films of Comparative Example 10 and Examples 22 to 24, there was no change of average direct reflectance, average optical density and lightness of the films, after heat treatment, as compared with the state before heat treatment.

Accordingly, the black polyimide films of Examples 23 and 24 are good as for average optical density, average direct reflectance, surface glossiness, lightness, as well as reflectivity at the end face after punching processing or surface glossiness, and heat resistance, and thus such black heat resistant light shading films can be utilized as a material such as a fixed diaphragm to be installed in a lens unit to be used under high temperature environment, a shutter blade or a diaphragm of a liquid crystal projector or the like. As for the film of Example 22, although average optical density was a little low of 3.5, it can be utilized limitedly for a part not requiring complete light shading performance such as an average optical density of 4.0 or higher, in the lens unit. However, the film of Comparative Example 10 having extremely low average optical density, or the film of Comparative Example 11 not providing good film appearance, it cannot be utilized as a material such as a fixed diaphragm, a shutter blade, a diaphragm of a liquid crystal projector or the like.

Comparative Example 12

A film was prepared by similar film thickness, type and content of the inorganic filler, matting processing as in Example 16, except that a black polyimide film was prepared without containing the black pigment in film preparation step.

Arithmetic average height Ra of the both surfaces of the film after forming uneven surface was 0.44 µm, as shown in Table 2-1. The obtained polyimide film had average direct reflectance in a wavelength of 380 to 780 nm and surface glossiness higher than Example 16, as shown in Table 2-2. In addition, average optical density in a wavelength of 380 to 780 nm was 0.4, smaller than that in Example 16. In addition, Film lightness L* was 50, showing very low blackness.

Punching processing was performed to observe reflection degree at its end face using a metal microscope, showing stronger reflection at the end face or surface glossiness as compared with Example 16. Observation result of the end face with SEM (Scanning Electron Microscope) or EPMA (Electron Probe X-ray Micro Analyzer) showed, fine unevenness at the end face, and presence of silica at the uneven portion. However, because of absence of carbon black for absorbing light, it is considered that reflection at the end face or surface glossiness became strong.

In addition, there was no change of average direct reflectance, average optical density and lightness of the films, after heat treatment, as compared with the state before heat treatment.

Accordingly, the polyimide film of Comparative Example 12 was good in heat resistance, however, it had lower average optical density, higher average direct reflectance and surface glossiness, as well as low blackness. Accordingly, it cannot be utilized as a material such as a fixed diaphragm used in a lens unit, a shutter blade, a diaphragm of a liquid crystal projector or the like.

Examples 25 and 26

Comparative Examples 13 and 14

Films were prepared using similar kind and content of the black pigment, kind of the inorganic filler, film thickness, a film preparation method and matting processing as in Example 16, except that content of the inorganic filler was changed to 2.0 parts by weight (Example 25), 25.0 parts by weight (Example 26), 1.0 part by weight (Comparative Example 13), and 26.0 parts by weight (Comparative Example 14).

Arithmetic average height Ra of the both surfaces of black polyimide films after forming uneven surface was 0.38 µm (Example 25), 0.41 µm (Example 26), 0.43 µm (Comparative Example 13), and 0.44 µm (Comparative Example 14), as shown in Table 2-1.

In addition, average direct reflectance in a wavelength of 380 to 780 nm, average optical density, a surface glossiness and lightness L* value of the obtained black polyimide films were measured, and as for Examples 25 and 26 and Comparative Example 14, similar results as in Example 16 were obtained, as shown in Table 2-2. However, in Comparative Example 13, due to low content of silica, as a matting material, average direct reflectance and surface glossiness were higher as compared with Example 14, as shown in Table 2-2. On the other hand, in Comparative Example 14, cross-sectional observation with SEM showed poor dispersion in a film due to high content of silica, causing flocculation and thus good film appearance was not obtained.

As for films of Example 25 and 26, and Comparative Example 13, punching processing was performed to observe reflection degree at its end face using a metal microscope, and as for films of Example 25 and 26, and it showed weak reflection at the end face or surface glossiness, and thus had a good state. However, the film of Comparative Example 13 had stronger reflection at the end face and surface glossiness, as compared with Example 16. Observation result of the end face with SEM (Scanning Electron Microscope) or EPMA (Electron Probe X-ray Micro Analyzer) showed no fine unevenness at the end face and many flat faces. It is considered that too low content of silica inhibited the forming of fine unevenness, which provided insufficient light scattering.

It should be noted that as for films of Examples 25 and 26, and Comparative Example 13, there was no change of average direct reflectance, average optical density and lightness of the films, after heat treatment, as compared with the state before heat treatment.

Accordingly, the black polyimide films of Examples 25 and 26 are good as for average optical density, average direct reflectance, surface glossiness, lightness, as well as reflectivity at the end face after punching processing or surface glossiness, and heat resistance, and thus such black heat resistant light shading films can be utilized as a material such as a fixed diaphragm to be used in a lens unit under high temperature environment, a shutter blade or a diaphragm of a liquid crystal projector or the like. However, as for the film of Comparative Example 13, having high reflection at the surface and the end face, as well as high surface glossiness, and the film of Comparative Example 14, not providing good film appearance, cannot be utilized as a diaphragm material.

Example 27

A film was prepared using similar kind and thickness of a film, similar kind and content of the black pigment, a film preparation method and matting processing as in Example 16, except that alumina was used as the inorganic filler.

Arithmetic average height Ra of the both surfaces of the film matting processing was 0.44 µm.

As for the black polyimide film after forming uneven surface, average direct reflectance in a wavelength of 380 to 780 nm, average optical density, and surface glossiness were measured, showing similar results as in Example 16. In addition, film lightness L* value was also shown to be equivalent to that in Example 16, as shown in Table 2-2, showing high black degree.

In addition, punching processing was performed, similarly as in Example 16, to observe reflection degree at its end face using a metal microscope, and as for the black polyimide film of Example 27, and it showed weak reflection at the end face or surface glossiness, similarly as in Example 16, and thus had a good state. Observation result of the end face with SEM (Scanning Electron Microscope) or EPMA (Electron Probe X-ray Micro Analyzer) showed fine unevenness at the end face.

In addition, there was no change of average direct reflectance, average optical density and lightness L* value of the films, after heat treatment, as compared with the state before heat treatment.

Accordingly, the black polyimide film of Example 27 is good as for average optical density, average direct reflectance, surface glossiness, lightness, as well as reflectivity at the end face after punching processing or surface glossiness, and heat resistance, and thus such a black heat resistant light shading film can be utilized as a material such as a fixed diaphragm to be used in a lens unit to be used under high temperature environment, a shutter blade or a diaphragm of a liquid crystal projector or the like.

Example 28

A film was prepared using similar kind and thickness of a film, similar kind and content of the black pigment, a film preparation method and matting processing as in Example 16, except that titanium oxide was used as the inorganic filler.

Arithmetic average height Ra of the both surfaces of the film matting processing was 0.44 μm.

As for the black polyimide film after forming uneven surface, average direct reflectance in a wavelength of 380 to 780 nm, average optical density, and surface glossiness were measured, showing similar results as in Example 16. In addition, film lightness L* value was also shown to be equivalent to that in Example 16, as shown in Table 2-2, showing high black degree.

In addition, punching processing was performed, similarly as in Example 16, to observe reflection degree at its end face using a metal microscope, and as for the black polyimide film prepared in Example 28, and it showed weak reflection at the end face or surface glossiness, similarly as in Example 16, and thus had a good state. Observation result of the end face with SEM (Scanning Electron Microscope) or EPMA (Electron Probe X-ray Micro Analyzer) showed fine unevenness at the end face.

In addition, there was no change of average direct reflectance, average optical density and film L* value, after heat treatment, as compared with the state before heat treatment.

Accordingly, the black polyimide film of Example 28 is good as for average optical density, average direct reflectance, surface glossiness, lightness, as well as reflectivity at the end face after punching processing or surface glossiness, and heat resistance, and thus such a black heat resistant light shading film can be utilized as a material such as a fixed diaphragm to be used in a lens unit to be used under high temperature environment, a shutter blade or a diaphragm of a liquid crystal projector or the like.

Example 29

A film was prepared using similar kind and thickness of a film, similar content of the black pigment, content of the inorganic filler, a film preparation method and matting processing as in Example 16, except that titanium black was used as the black pigment.

Arithmetic average height Ra of the both surfaces of the film matting processing was 0.44 μm, as shown in Table 2-1.

As for the black polyimide film after forming uneven surface, average direct reflectance in a wavelength of 380 to 780 nm, average optical density, and surface glossiness were measured, showing similar results as in Example 16, as shown in Table 2-2. In addition, film lightness L* value was also shown to be equivalent to that in Example 16, as shown in Table 2-2, showing high black degree.

In addition, punching processing was performed, similarly as in Example 16, to observe reflection degree at its end face using a metal microscope, and as for the black polyimide film prepared in Example 29, and it showed weak reflection at the end face or surface glossiness, similarly as in Example 16, and thus had a good state. Observation result of the end face with SEM (Scanning Electron Microscope) or EPMA (Electron Probe X-ray Micro Analyzer) showed fine unevenness at the end face.

In addition, there was no change of average direct reflectance, average optical density and film L* value, after heat treatment, as compared with the state before heat treatment.

Accordingly, the black polyimide film of Example 29 is good as for average optical density, average direct reflectance, surface glossiness, lightness, as well as reflectivity at the end face after punching processing or surface glossiness, and heat resistance, and thus such a black heat resistant light shading film can be utilized as a material such as a fixed diaphragm to be used in a lens unit under high temperature environment, a shutter blade or a diaphragm of a liquid crystal projector or the like.

Example 30

A film was prepared using similar kind and thickness of a film, similar content of the black pigment, content of the inorganic filler, a film preparation method and matting processing as in Example 16, except that aniline black was used as the black pigment.

Arithmetic average height Ra of the both surfaces of the film matting processing was 0.45 μm, as shown in Table 2-1.

As for the black polyimide film after forming uneven surface, average direct reflectance in a wavelength of 380 to 780 nm, average optical density, and surface glossiness were measured, showing similar results as in Example 16, as shown in Table 2-2. In addition, film lightness L* value was also shown to be equivalent to that in Example 1, as shown in Table 2-2, showing high black degree.

In addition, punching processing was performed, similarly as in Example 16, to observe reflection degree at its end face using a metal microscope, and as for the black polyimide film prepared in Example 30, and it showed weak reflection at the end face or surface glossiness, similarly as in Example 16, and thus had a good state. Observation result of the end face with SEM (Scanning Electron Microscope) or EPMA (Electron Probe X-ray Micro Analyzer) showed fine unevenness at the end face.

In addition, after heat treatment, there was no change of average direct reflectance, average optical density and film L* value, as compared with the state before heat treatment.

Accordingly, the black polyimide film of Example 30 is good as for average optical density, average direct reflectance, surface glossiness, lightness, as well as reflectivity at the end face after punching processing or surface glossiness, and heat resistance, and thus such a black heat resistant light shading film can be utilized as a material such as a fixed diaphragm to be installed in a lens unit to be used under high temperature environment, a shutter blade or a diaphragm of a liquid crystal projector or the like.

TABLE 2-1

| Example | Kind of heat resistant resin | Black pigment Kind | Black pigment Content (parts by wt) | Inorganic filler Kind | Inorganic filler Content (parts by wt) | Film thickness (μm) | Arithmatic average height Ra (μm) |
|---|---|---|---|---|---|---|---|
| Example 16 | Polyimide | Carbon black | 12.0 | Silica | 4.0 | 25 | 0.21 |
| Example 17 | | | 12.0 | | 4.0 | 25 | 0.41 |
| Example 18 | | | 12.0 | | 4.0 | 25 | 1.06 |
| Example 19 | | | 12.0 | | 4.0 | 25 | 2.20 |
| Comparable Example 8 | | | 12.0 | | 4.0 | 25 | 2.30 |
| Comparable Example 9 | | | 12.0 | | 4.0 | 25 | 0.10 |
| Example 20 | | | 12.0 | | 4.0 | 12.5 | 0.33 |
| Example 21 | | | 12.0 | | 4.0 | 7.5 | 0.36 |
| Comparable Example 10 | | | 4.0 | | 4.0 | 25 | 0.52 |
| Example 22 | | | 5.0 | | 4.0 | 25 | 0.44 |
| Example 23 | | | 15.0 | | 4.0 | 25 | 0.44 |
| Example 24 | | | 22.0 | | 4.0 | 25 | 0.31 |
| Comparable Example 11 | | | 23.0 | | 4.0 | 25 | 0.67 |
| Comparable Example 12 | | — | 0.0 | | 4.0 | 25 | 0.44 |
| Example 25 | | Carbon black | 12.0 | | 2.0 | 25 | 0.38 |
| Example 26 | | | 12.0 | | 25.0 | 25 | 0.41 |
| Comparable Example 13 | | | 12.0 | | 1.0 | 25 | 0.43 |
| Comparable Example 14 | | | 12.0 | | 26.0 | 25 | 0.44 |
| Example 27 | | | 12.0 | Alumina | 4.0 | 25 | 0.44 |
| Example 28 | | | 12.0 | Titanium oxide | 4.0 | 25 | 0.44 |
| Example 29 | | Titanium black | 12.0 | Silica | 4.0 | 25 | 0.44 |
| Example 30 | | Aniline black | 12.0 | | 4.0 | 25 | 0.45 |

TABLE 2-2

| Example | Average direct reflectance in wavelength of 380 to 780 nm (%) | Average optical density in wavelength of 380 to 780 nm (%) | Lightness L* | Surface glossiness | Reflection at the end face and surface glossiness | Change in heating at 155° C. in air for 30 minutes Average direct reflectance | Change in heating at 155° C. in air for 30 minutes Average optical density | Change in heating at 155° C. in air for 30 minutes Lightness L* | Change in heating at 200° C. in air for 30 minutes Average direct reflectance | Change in heating at 200° C. in air for 30 minutes Average optical density | Change in heating at 200° C. in air for 30 minutes Lightness L* | Change in heating at 270° C. in air for 30 minutes Average direct reflectance | Change in heating at 270° C. in air for 30 minutes Average optical density | Change in heating at 270° C. in air for 30 minutes Lightness L* |
|---|---|---|---|---|---|---|---|---|---|---|---|---|---|---|
| Example 16 | 0.23 | >4.0 | 30 | 4 | ○ | No | No | No | No | No | No | No | No | No |
| Example 17 | 0.24 | >4.0 | 31 | 4 | ○ | No | No | No | No | No | No | No | No | No |
| Example 18 | 0.21 | >4.0 | 32 | 5 | ○ | No | No | No | No | No | No | No | No | No |
| Example 19 | 0.22 | >4.0 | 30 | 5 | ○ | No | No | No | No | No | No | No | No | No |
| Comparable Example 8 | 0.24 | >4.0 | 30 | 5 | ○ | — | — | — | — | — | — | — | — | — |
| Comparable Example 9 | 0.65 | >4.0 | 32 | 13 | ○ | No | No | No | No | No | No | No | No | No |
| Example 20 | 0.41 | >4.0 | 29 | 6 | ○ | No | No | No | No | No | No | No | No | No |
| Example 21 | 0.43 | >4.0 | 30 | 6 | ○ | No | No | No | No | No | No | No | No | No |
| Comparable Example 10 | 0.34 | 2.9 | 42 | 6 | x | No | No | No | No | No | No | No | No | No |

TABLE 2-2-continued

| Example | Average direct reflectance in wavelength of 380 to 780 nm (%) | Average optical density in wavelength of 380 to 780 nm (%) | Lightness L* | Surface glossiness | Reflection at the end face and surface glossiness | Change in heating at 155° C. in air for 30 minutes | | | Change in heating at 200° C. in air for 30 minutes | | | Change in heating at 270° C. in air for 30 minutes | | |
|---|---|---|---|---|---|---|---|---|---|---|---|---|---|---|
| | | | | | | Average direct reflectance | Average optical density | Lightness L* | Average direct reflectance | Average optical density | Lightness L* | Average direct reflectance | Average optical density | Lightness L* |
| Example 22 | 0.32 | 3.5 | 34 | 6 | ○ | No | No | No | No | No | No | No | No | No |
| Example 23 | 0.32 | >4.0 | 29 | 6 | ○ | No | No | No | No | No | No | No | No | No |
| Example 24 | 0.21 | >4.0 | 31 | 4 | ○ | No | No | No | No | No | No | No | No | No |
| Comparable Example 11 | 0.27 | >4.0 | 31 | 4 | ○ | — | — | — | — | — | — | — | — | — |
| Comparable Example 12 | 0.45 | 0.4 | 50 | 10 | x | No | No | No | No | No | No | No | No | No |
| Example 25 | 0.35 | >4.0 | 32 | 6 | ○ | No | No | No | No | No | No | No | No | No |
| Example 26 | 0.32 | >4.0 | 30 | 5 | ○ | No | No | No | No | No | No | No | No | No |
| Comparable Example 13 | 0.42 | >4.0 | 31 | 10 | x | No | No | No | No | No | No | No | No | No |
| Comparable Example 14 | 0.35 | >4.0 | 33 | 6 | — | — | — | — | — | — | — | — | — | — |
| Example 27 | 0.33 | >4.0 | 32 | 4 | ○ | No | No | No | No | No | No | No | No | No |
| Example 28 | 0.32 | >4.0 | 33 | 5 | ○ | No | No | No | No | No | No | No | No | No |
| Example 29 | 0.31 | >4.0 | 33 | 5 | ○ | No | No | No | No | No | No | No | No | No |
| Example 30 | 0.31 | >4.0 | 33 | 5 | ○ | No | No | No | No | No | No | No | No | No |

Example 31

To a polyphenylene sulfide resin, N-methyl-2-pyrrolidone was added as a solvent, and as shown in table 3-1, 12.0 parts by weight of carbon black (an average particle diameter of 0.05 μm), as the black pigment, and 4.0 parts by weight of silica, as the inorganic filler, were mixed using a roller mill, relative to 100 parts by weight of a solid part of the solution, to prepare a solution of black polyphenylene sulfide resin. The resin solution prepared was coated on a supporting substance, so as to attain a film thickness after drying under heating of 25 μm, using a blade coater, and dried under heating at 150° C. for 20 minutes, and then at 220° C. for 1 hour, and then it was peeled from the supporting substance to prepare a black polyphenylene sulfide film.

As for the both film surfaces, using silica sand (average particle diameter: 100 μm), as a shot material, 20 kg/m² of the silica sand was shot, while conveying the film at a rate of 5 m/minute, and then washed it with water for 3 minutes, and dried it at 80° C. for 2 minutes. Next, the film was turned inside out to perform similar matting processing to form uneven surface so as to attain arithmetic average height Ra of 0.22 μm.

The black polyphenylene sulfide film after forming uneven surface has an average direct reflectance in a wavelength of 380 to 780 nm of 0.34%, and a surface glossiness of 6. Average optical density attained 4.0 or higher thus having complete light shading performance. In addition, L* value showing lightness of the film is 30, and it was found to have high blackness.

The black heat resistant light shading film thus prepared was subjected to punching processing to observe reflection degree at its end face using a metal microscope, and as for the black polyphenylene sulfide film prepared in Example 31, and it showed weak reflection or surface glossiness of the end face and thus had a good state. Observation result of the end face with SEM (Scanning Electron Microscope) or EPMA (Electron Probe X-ray Micro Analyzer) showed fine unevenness at the end face, and it is considered to contribute to light scattering, thus providing reduced reflection or surface glossiness.

In addition, as a result of heat treatment in air at 155° C., 200° C. and 270° C. for 30 minutes, there was no change of average direct reflectance, average optical density and lightness, in a wavelength of 380 to 780 nm, at 155° C. and 200° C., as compared with the state before heat treatment, however, film deformation was significant at 270° C.

Accordingly, the black polyphenylene sulfide film of Example 31 is good as for average optical density, average direct reflectance, surface glossiness, lightness, as well as reflectivity at the end face after punching processing or surface glossiness, and heat resistance, and thus such a black heat resistant light shading film can be utilized as a material such as a fixed diaphragm to be installed in a lens unit to be used at 200° C. or lower, a shutter blade or a diaphragm of a liquid crystal projector or the like.

Examples 32 to 34

Comparative Examples 15 and 16

Films were prepared using similar film thickness, similar kind and content of the black pigment and the inorganic filler, a film preparation method and matting processing, as in Example 31, except that arithmetic average height Ra of the both surfaces of the film formed by matting processing were changed to 0.34 μm (Example 32), 1.14 μm (Example 33), 2.20 μm (Example 34), 2.30 μm (Comparative Example 15), 0.10 μm (Comparative Example 16), as shown in Table 3-1.

Average direct reflectance in a wavelength of 380 to 780 nm, and average optical density, surface glossiness, and lightness L* value of the black polyphenylene sulfide film after forming uneven surface were measured, and in Examples 32 to 34 and Comparative Examples 15, similar results as in Example 31 were obtained, as shown in Table 3-2. However, in Comparative Examples 16, average optical density and lightness L* value were equal to Example 31, as shown in Table 3-2, but average direct reflectance and surface glossiness were higher than Example 31. However, in Comparative Examples 15 since conveying speed in matting processing was slowed extremely to increase arithmetic average height Ra of the film, many fine pores were generated in the film, therefore a good film was not obtained.

Accordingly, although average optical density in a wavelength of 380 to 780 nm, average direct reflectance, surface glossiness and film lightness of the black polyphenylene sulfide film of Comparative Example 15 were good, a good film was not obtained in view of appearance.

Accordingly, although average optical density in a wavelength of 380 to 780 nm, and film lightness of the black polyphenylene sulfide film of Comparative Example 16 were good, because of having high average direct reflectance and surface glossiness, it cannot be utilized as a material such as a fixed diaphragm to be installed in a lens unit, a shutter blade, a diaphragm of a liquid crystal projector or the like.

As for the prepared black heat resistant light shading films in Examples 32 to 34 and Comparative Examples 15 and 16, punching processing was performed, similarly as in Example 31, to observe reflection degree at its end face using a metal microscope, and it showed weak reflection at the end face or surface glossiness, similarly as in Example 31, and thus had a good state. Observation result of the end face with SEM (Scanning Electron Microscope) or EPMA (Electron Probe X-ray Micro Analyzer) showed fine unevenness at the end face, and it was found presence of silica at the uneven portion.

It should be noted that, as for films prepared in Examples 32 to 34 and Comparative Example 16, after heat treatment in air at 155° C. and 200° C., there was no change of average direct reflectance, surface glossiness, average optical density and film lightness, as compared with the state before heat treatment, however, film deformation was significant at 270° C.

Accordingly, the black polyphenylene sulfide films of Examples 32 to 34 were good as for average optical density, average direct reflectance, surface glossiness, as well as reflectivity at the end face after punching processing or surface glossiness, and lightness, however they did not have heat resistance of 270° C., therefore, they cannot be utilized as a diaphragm material for a camera module with a structure of wafer level chip size package (WLCSP), however, they can be utilized as a diaphragm material or blade material whose use temperature is at least up to 200° C.

However, the black polyphenylene sulfide film of Comparative Example 15 not providing a good film cannot be utilized as a material such as a fixed diaphragm, a shutter blade, a diaphragm of a liquid crystal projector or the like.

Examples 35 and 36

Films were prepared using similar kind and content of the black pigment and the inorganic filler, a film preparation method and matting processing as in Example 31, except that thickness of the black polyphenylene sulfide film was changed to 12 μm (Example 35) and 7 μm (Example 36). Arithmetic average height Ra of the both surfaces of the film after forming uneven surface was 0.27 μm (Example 35) and 0.34 μm (Example 36), as shown in Table 3.

Average direct reflectance and average optical density in a wavelength of 380 to 780 nm and a surface glossiness of the obtained black polyphenylene sulfide film were measured, and similar results as in Example 31 were obtained. In addition, L* value showing lightness of the film was also similar to Example 31, and it was found to have high blackness.

As for the prepared black heat resistant light shading films in Examples 35 and 36, punching processing was performed, similarly as in Example 27, and reflection degree at its end face was observed using a metal microscope, and the results showed weak reflection at the end face or surface glossiness, similarly as in Example 27, and thus had a good state. Observation result of the end face with SEM (Scanning Electron Microscope) or EPMA (Electron Probe X-ray Micro Analyzer) showed fine unevenness at the end face, and presence of silica at the uneven portion.

It should be noted that, as for the black polyphenylene sulfide films of Examples 35 and 36, after heat treatment in air at 155° C. and 200° C., there was no change of average direct reflectance, surface glossiness, average optical density and film lightness L* value, as compared with the state before heat treatment, however, film deformation was significant at 270° C.

Accordingly, the black polyphenylene sulfide films of Examples 35 and 36 are good as for average optical density, average direct reflectance, surface glossiness, ligthness, as well as reflectivity at the end face after punching processing or surface glossiness, but they do not have heat resistance of 270° C., therefore they cannot be utilized as a diaphragm material for a camera module with a structure of wafer level chip size package (WLCSP), however, they can be utilized as a diaphragm material or blade material whose use temperature is at least up to 200° C.

Examples 37 to 39

Comparative Examples 17 and 18

Black polyphenylene sulfide films with similar thickness as in Example 31 were prepared, except that content of carbon black of the black pigment was changed to 4.0 parts by weight (Comparative Example 17), 5.0 parts by weight (Example 37), 15.0 parts by weight (Example 38), 22.0 parts by weight (Example 39), 23.0 parts by weight (Comparative Example 18), as shown in Table 3-1. It should be noted that matt processing was also performed similarly as in Example 31.

Arithmetic average height Ra of the both surfaces of the film after forming uneven surface was 0.35 μm (Comparative Example 17), 0.39 μm (Example 37), 0.39 μm (Example 38), 0.42 μm (Example 39), and 0.70 μm (Comparative Example 18), as shown in Table 3-1.

Average direct reflectance and average optical density in a wavelength of 380 to 780 nm and a surface glossiness and lightness L* value of the obtained black polyphenylene sulfide film were measured, and as for Examples 38 and 39, and Comparative Example 18, similar results as in Example 31 were obtained, as shown in Table 3-2. On the other hand, as shown in Table 3-2, the films of Comparative Example 17 and Example 37 had average direct reflectance in a wavelength of 380 to 780 nm similar to that of Example 31, but had an average optical density of 2.8 and 3.5, respectively, showing not having complete light shading performance. In addition, the film of Comparative Example 17 had higher lightness L* value as compared with Example 31, showing lower blackness.

It is considered that as for the film of Comparative Example 17, lower content of carbon black provided insufficient light absorption and therefore lower light shading performance. On the other hand, as for the film of Comparative Example 18, because of high content of carbon black, carbon black was not dispersed uniformly. Therefore, characteristics such as uneven surface, average optical density, average direct reflectance, a surface glossiness and lightness showed non-uniform, and thus a good film was not obtained.

As for the black heat resistant light shading films prepared in Examples 37 to 39 and Comparative Example 18, punching processing was performed, and reflection degree at its end face was observed using a metal microscope, and the results showed no reflection at the end face or surface glossiness observed. Observation result of the end face with SEM (Scanning Electron Microscope) or EPMA (Electron Probe X-ray Micro Analyzer) showed fine unevenness at the end face, and presence of silica at the uneven portion. As for the film of Comparative Example 17, because of low content of carbon black, light absorption became insufficient and reflection at the end face or surface glossiness was observed.

In addition, after heat treatment in air at 155° C. and 200° C., there was no change of average direct reflectance, average optical density and film lightness, as compared with the state before heat treatment, however, film deformation was significant at 270° C.

Accordingly, the black polyphenylene sulfide films of Examples 38 and 39 were good as for average optical density, average direct reflectance, surface glossiness, lightness, as well as reflectivity at the end face after punching processing or surface glossiness, however they did not have heat resistance of 270° C., therefore, they cannot be utilized as a diaphragm material for a camera module with a structure of wafer level chip size package (WLCSP), however, they can be utilized as a diaphragm material or blade material whose use temperature is at least up to 200° C.

In addition, as for Example 37 having an average optical density of 3.5, not showing complete light shading performance, only limited utilization can be allowed for apart not requiring complete light shading performance, in a lens unit.

It should be noted that, the film of Comparative Example 17 having extremely low average optical density and strong reflection at the end face after processing or surface glossiness, or the film of Comparative Example 18 not providing a good appearance film cannot be utilized as a member such as a fixed diaphragm, a shutter blade, a diaphragm of a liquid crystal projector or the like.

Comparative Example 19

A film was prepared by similar film thickness, type and content of the inorganic filler, matting processing as in Example 31, except that a black polyphenylene sulfide film was prepared was without containing the black pigment in film preparation step.

Arithmetic average height Ra of the both surfaces of the film after forming uneven surface was 0.32 Tim, as shown in Table 3-1. The obtained polyphenylene sulfide film had average direct reflectance in a wavelength of 380 to 780 nm and surface glossiness, higher than those in Example 31, as shown in Table 3-2. In addition, average optical density was 0.3, showing lower average optical density that of Example 31. Film lightness L* was 51, showing extremely low blackness.

Punching processing was performed similarly as in Example 27 to observe reflection degree at its end face using a metal microscope, showing stronger reflection at the end face or surface glossiness than that of Example 31. Observation result of the end face with SEM (Scanning Electron Microscope) or EPMA (Electron Probe X-ray Micro Analyzer) showed, fine unevenness at the end face, and presence of silica at the uneven portion. It is considered that because of absence of carbon black for absorbing light, reflection at the end face or surface glossiness became strong.

In addition, heat treatment was performed in air at 155° C., 200° C. and 270° C., and there was no change of average direct reflectance, average optical density and lightness L* value of the films at 155° C. and 200° C., as compared with the state before heat treatment, however, film deformation was significant at 270° C.

Accordingly, the polyphenylene sulfide film of Comparative Example 19, having low average optical density and high average direct reflectance reflection and surface glossiness, as well as low blackness, cannot be utilized as a material such as a fixed diaphragm installed inside the lens unit, a shutter blade, a diaphragm of a liquid crystal projector or the like.

Examples 40 and 41

Comparative Examples 20 and 21

Films were prepared using similar kind and content of the black pigment, kind of the inorganic filler, film thickness, a film preparation method and matting processing as in Example 31, except that content of the inorganic filler was changed to 2.0 parts by weight (Example 40), 25.0 parts by weight (Example 41), 1.0 part by weight (Comparative Example 20), and 26.0 parts by weight (Comparative Example 21).

Arithmetic average height Ra of the both surfaces of black polyphenylene sulfide films after forming uneven surface was 0.36 μm (Example 40), 0.40 μm (Example 41), 0.41 μm (Comparative Example 20), and 0.50 μm (Comparative Example 21), as shown in Table 3-1.

In addition, average direct reflectance and average optical density in a wavelength of 380 to 780 nm, a surface glossiness and lightness L* value of the obtained black polyphenylene sulfide films were measured, and as for Examples 40 and 41 and Comparative Example 21, similar results as in Example 31 were obtained, as shown in Table 3-2. However, in the film of Comparative Example 20, due to low content of silica, used as a matting material, average direct reflectance and surface glossiness were higher as compared with Example 31, as shown in Table 3-2. On the other hand, in the film of Comparative Example 21, cross-sectional observation with SEM showed poor dispersion in a film due to high content of silica, causing condensation and thus good film appearance was not obtained.

As for films of Example 40 and 41, and Comparative Examples 20, punching processing was performed, similarly as in Example 31, to observe reflection degree at its end face using a metal microscope, and as for the black polyphenylene sulfide films prepared in Examples 40 and 41, and it showed weak reflection at the end face or surface glossiness, similarly as in Example 27, and thus had a good state. However, the film of Comparative Example 20 had stronger reflection at the end face or surface glossiness as compared with Example 31. Observation result of the end face with SEM (Scanning Electron Microscope) or EPMA (Electron Probe X-ray Micro Analyzer) showed no fine unevenness at the end face, and many flat faces were observed. The reason is considered that too low content of silica inhibited formation of fine unevenness, causing insufficient light scattering.

As for films of Examples 40 and 41, and Comparative Example 20, heat treatment was performed in air at 155° C., 200° C. and 270° C., and there was no change of average direct reflectance, average optical density and lightness L* value of the films at 155° C. and 200° C., as compared with the state before heat treatment, however, film deformation was significant at 270° C.

Accordingly, the black polyphenylene sulfide films of Examples 40 and 41 are good as for average optical density, average direct reflectance, surface glossiness, lightness, as well as reflectivity at the end face after punching processing, and thus such black heat resistant light shading films can be utilized as a material such as a fixed diaphragm used at 200° C. or lower, a shutter blade or a diaphragm of a liquid crystal projector or the like. However, as for the film of Comparative Example 20, having high reflection at the surface and the end face, as well as high surface glossiness, and the film of Comparative Example 21, not providing good film appearance, cannot be utilized as a diaphragm material.

Example 42

A film was prepared using similar kind and thickness of a film, similar kind and content of the black pigment, a film preparation method and matting processing as in Example 31, except that alumina was used as the inorganic filler.

Arithmetic average height Ra of the both surfaces of the film matting processing was 0.44 μm, as shown in Table 3-1.

As for the black polyphenylene sulfide film after forming uneven surface, average direct reflectance in a wavelength of 380 to 780 nm, average optical density, and surface glossiness were measured, showing similar results as in Example 31. In addition, film lightness L* value was also shown to be equivalent to that in Example 31, showing high black degree.

In addition, punching processing was performed, similarly as the film of Example 31, to observe reflection degree at its end face using a metal microscope, and as for Example 43, and it showed weak reflection at the end face or surface glossiness, similarly as in Example 31, and thus had a good state. Observation result of the end face with SEM (Scanning Electron Microscope) or EPMA (Electron Probe X-ray Micro Analyzer) showed fine unevenness at the end face. It is considered that this fine unevenness contributed to light scattering, providing low reflection or low surface glossiness.

Heat treatment was performed in air at 155° C., 200° C. and 270° C., and there was no change of average direct reflectance, average optical density and lightness L* value of the films at 155° C. and 200° C., as compared with the state before heat treatment, however, film deformation was significant at 270° C.

Accordingly, the black polyphenylene sulfide films of Example 42 is good as for average optical density, average direct reflectance, surface glossiness, lightness, as well as reflectivity at the end face after punching processing, and thus such a black heat resistant light shading film can be utilized as a material such as a fixed diaphragm used at 200° C. or lower, a shutter blade or a diaphragm of a liquid crystal projector or the like.

Example 43

A film was prepared using similar kind and thickness of a film, similar kind and content of the black pigment, a film preparation method and matting processing as in Example 31, except that titanium oxide was used as the inorganic filler.

Arithmetic average height Ra of the both surfaces of the film matting processing was 0.44 μm, as shown in Table 3-1.

As for the black polyphenylene sulfide film after forming uneven surface, average direct reflectance in a wavelength of 380 to 780 nm, average optical density, and surface glossiness were measured, showing similar results as in Example 31. In addition, film lightness L* value was also shown to be equivalent to that in Example 31, showing high black degree.

In addition, punching processing was performed, similarly as in Example 31, to observe reflection degree at its end face using a metal microscope, and as for Example 43, and it showed weak reflection at the end face or surface glossiness, similarly as in Example 31, and thus had a good state. Observation result of the end face with SEM (Scanning Electron Microscope) or EPMA (Electron Probe X-ray Micro Analyzer) showed fine unevenness at the end face. It is considered that this fine unevennesscontributed to light scattering, providing low reflection or low surface glossiness.

In addition, heat treatment was performed in air at 155° C., 200° C. and 270° C., and there was no change of average direct reflectance, average optical density and lightness L* value of the films at 155° C. and 200° C., as compared with the state before heat treatment, however, film deformation was significant at 270° C.

Accordingly, the black polyphenylene sulfide film of Example 43 is good as for average optical density, average direct reflectance, surface glossiness, lightness, as well as reflectivity at the end face after punching processing, and thus such a black heat resistant light shading film can be utilized as a material such as a fixed diaphragm used at 200° C. or lower, a shutter blade or a diaphragm of a liquid crystal projector or the like.

Example 44

A film was prepared using similar kind and thickness of a film, similar content of the black pigment, similar kind and content of the inorganic filler, a film preparation method and matting processing as in Example 1, except that titanium black was used as the black pigment.

Arithmetic average height Ra of the both surfaces of the film matting processing was 0.44 μm, as shown in Table 3-1.

As for the black polyphenylene sulfide film after forming uneven surface, average direct reflectance and average optical density in a wavelength of 380 to 780 nm, and surface glossiness were measured, showing similar results as in Example 31, as shown in Table 3-2. In addition, film lightness L* value was also shown to be equivalent to that in Example 31, showing high black degree.

In addition, punching processing was performed, similarly as in Example 31, to observe reflection degree at its end face using a metal microscope, and it showed weak reflection at the end face or surface glossiness, similarly as in Example 31, and thus had a good state. Observation result of the end face with SEM (Scanning Electron Microscope) or EPMA (Electron Probe X-ray Micro Analyzer) showed fine unevenness at the end face. It is considered that this fine unevenness contributed to light scattering, providing low reflection or low surface glossiness.

In addition, heat treatment was performed in air at 155° C., 200° C. and 270° C., and after the heat treatment, there was no change of average direct reflectance, average optical density and lightness L* value of the films at 155° C. and 200° C., as compared with the state before heat treatment, however, film deformation was significant at 270° C.

Accordingly, the black polyphenylene sulfide film of Example 44 is good as for average optical density, average direct reflectance, surface glossiness, lightness, as well as reflectivity at the end face after punching processing, and thus such a black heat resistant light shading film can be utilized as a material such as a fixed diaphragm to be installed in a lens unit to be used at 200° C. or lower, a shutter blade or a diaphragm of a liquid crystal projector or the like.

Example 45

A film was prepared using similar kind and thickness of a film, similar content of the black pigment, similar kind and content of the inorganic filler, a film preparation method and matting processing as in Example 31, except that aniline black was used as the black pigment.

Arithmetic average height Ra of the both surfaces of the film matting processing was 0.43 μm, as shown in Table 3-1.

As for the black polyphenylene sulfide film after forming uneven surface, average direct reflectance and average optical density in a wavelength of 380 to 780 nm, and surface glossiness were measured, showing similar results as in Example 31, as shown in Table 3-2. In addition, film lightness L* value was also shown to be equivalent to that in Example 31, showing high black degree.

In addition, punching processing was performed, similarly as in Example 31, to observe reflection degree at its end face using a metal microscope, and it showed weak reflection at the end face or surface glossiness, similarly as in Example 31, and thus had a good state. Observation result of the end face with SEM (Scanning Electron Microscope) or EPMA (Electron Probe X-ray Micro Analyzer) showed fine unevenness at the end face. It is considered that this fine unevenness contributed to light scattering, providing low reflection or low surface glossiness.

In addition, heat treatment was performed in air at 155° C., 200° C. and 270° C., and after the heat treatment, there was no change of average direct reflectance, average optical density and lightness L* value of the films at 155° C. and 200° C., as compared with the state before heat treatment, however, film deformation was significant at 270° C.

Accordingly, the black polyphenylene sulfide film of Example 45 is good as for average optical density, average direct reflectance, surface glossiness, lightness, as well as reflectivity at the end face after punching processing, and thus such a black heat resistant light shading film can be utilized as a material such as a fixed diaphragm to be installed in a lens unit to be used at 200° C. or lower, a shutter blade or a diaphragm of a liquid crystal projector or the like.

Examples 46 to 48

Films were prepared using similar film thickness, similar kind and content of the black pigment and the inorganic filler, and matting processing as in Example 1, except that a raw material of the resin film was changed from a polyamideimide resin to a polyethylene naphthalate resin (Example 46), an aramide resin (Example 47), and a polyether sulfone resin (Example 48). In addition, in film preparation, drying temperature of each resin solution after peeling from the supporting substance was set at 150° C. (Examples 46 and 48), and Example 47 was performed similarly as in Example 1. Arithmetic average height Ra of the both surfaces of the film matting processing was, as shown in Table 3-1, 0.40 μm (Example 46), 0.43 μm (Example 47), and 0.42 μm (Example 48).

As for the black heat resistant light shading films after forming uneven surface, average direct reflectance and average optical density in a wavelength of 380 to 780 nm, and surface glossiness were measured, showing similar results as in Example 1. In addition, L* value showing film lightness was also shown to be equivalent to that in Example 1, showing high black degree.

In addition, punching processing was performed, similarly as the film of Example 1, to observe reflection degree at its end face using a metal microscope, and as for the black heat resistant light shading films of Examples 46 to 48, and it showed weak reflection at the end face or surface glossiness, similarly as in Example 1, and thus had a good state. Observation result of the end face with SEM (Scanning Electron Microscope) or EPMA (Electron Probe X-ray Micro Analyzer) showed fine unevenness at the end face. It is considered that this fine unevenness contributed to light scattering, providing low reflection or low surface glossiness.

After heat treatment in air at 155° C., 200° C. and 270° C. for 30 minutes, the film of Example 46 deformed significantly at 200° C. and 270° C., while the film of Example 48 deformed significantly at 270° C. The film of Example 47 did not deform at 155° C., 200° C. and 270° C.

There was no change of average direct reflectance and average optical density of the films, in a wavelength of 380 to 780 nm, as compared with the state before heat treatment, at up to temperature showing no deformation of the film. In addition lightness was not changed as compared with the state before heat treatment.

Accordingly, the black polyethylene naphthalate film of Example 46 had heat resistance at least up to 155° C., the black aramide film of Example 47 had heat resistance at least up to 270° C., and the black polyether sulfone film of Example 48 had heat resistance at least up to 200° C., and are good as for average optical density, average direct reflectance, surface glossiness, lightness, as well as reflectivity at the end face after punching processing or surface glossiness, and lightness, and thus they can be utilized as a material such as a fixed diaphragm to be installed in a lens unit to be used up to each heat resistant temperature, a shutter blade or a diaphragm of a liquid crystal projector or the like.

Example 49

A heat resistant light shading tape was prepared by forming an adhesive layer with a thickness of 50 μm, using an acryl-type pressure sensitive adhesive (trade name: 9079, produced by Sumitomo 3M Co., Ltd.) at the both surfaces of the black polyamideimide film prepared in Example 1.

Average optical density in a wavelength of 380 to 780 nm was maintained at 4.0 or higher, even after heat treatment in air at 270° C., thus having complete light shading performance. In addition, average direct reflectance in a wavelength of 380 to 780 nm was 0.24%, showing low reflection, and there was no change of average optical density, average direct reflectance and surface glossiness before and after heat treatment.

Accordingly, the black polyamideimide film of Example 43, because of forming an adhesive layer at the both surfaces thereof, can adhere at a circumference part of the rear face side of an image sensor such as CCD or CMOS, and thus is useful as the black heat resistant light shading film for shading leakage of light injecting to the rear face of the image sensor.

Examples 50 and 51

A protection sheet having a slightly adhesive layer was laminated at the both surfaces of the black polyamideimide film of Example 1 (Example 50) and the black polyimide film of Example 16 (Example 51). It was then cut into a square sheet with a side length of 100 mm, and within a circle having a diameter of 80 mm inside the sheet, many ring-like diaphragms, with an outer diameter of 4 mm and an inner diameter of 2 mm, and having a structure where each diaphragm was coupled at the exterior circumference part thereof by a lead, were prepared by punching processing. In the punching processing, after punching of the ring-like diaphragm, further punched to a wafer shape with a diameter of 80 mm, and the slightly pressure sensitive protection sheet was peeled to obtain a wafer formed with many diaphragms.

Similarly as in Example 1, degree of reflection at the end face was observed with a metal microscope, as for each of the diaphragms obtained in Examples 50 and 51, and it was found that reflection at the end face or surface glossiness was weak similarly as in Example 1. In addition, surface appearance of the diaphragms was observed with a metal microscope, and there was found no appearance defect such as crack or burr.

Accordingly, the black polyamideimide film prepared in Example 50 and the black polyimide film prepared in Example 51 can be punched into a wafer-like diaphragm shape, each having low reflection or surface glossiness at each end face, as well as there was no crack or burr caused by punching, therefore they are very useful as a diaphragm material fora camera module with a WLCSP structure.

TABLE 3-1

| Example | Kind of heat resistant resin | Black pigment Kind | Black pigment Content (parts by wt) | Inorganic filler Kind | Inorganic filler Content (parts by wt) | Film thickness (μm) | Arithmatic average height Ra (μm) |
|---|---|---|---|---|---|---|---|
| Example 31 | Polyphenylene sulfide | Carbon black | 12.0 | Silica | 4.0 | 25 | 0.22 |
| Example 32 | | | 12.0 | | 4.0 | 25 | 0.34 |
| Example 33 | | | 12.0 | | 4.0 | 25 | 1.14 |
| Example 34 | | | 12.0 | | 4.0 | 25 | 2.20 |
| Comparable Example 15 | | | 12.0 | | 4.0 | 25 | 2.30 |
| Comparable Example 16 | | | 12.0 | | 4.0 | 25 | 0.10 |
| Example 35 | | | 12.0 | | 4.0 | 12 | 0.27 |
| Example 36 | | | 12.0 | | 4.0 | 7 | 0.34 |
| Comparable Example 17 | | | 4.0 | | 4.0 | 25 | 0.35 |
| Example 37 | | | 5.0 | | 4.0 | 25 | 0.39 |
| Example 38 | | | 15.0 | | 4.0 | 25 | 0.39 |
| Example 39 | | | 22.0 | | 4.0 | 25 | 0.42 |
| Comparable Example 18 | | | 23.0 | | 4.0 | 25 | 0.70 |
| Comparable Example 19 | | — | 0.0 | | 4.0 | 25 | 0.32 |
| Example 40 | | Carbon black | 12.0 | | 2.0 | 25 | 0.36 |
| Example 41 | | | 12.0 | | 25.0 | 25 | 0.40 |
| Comparable Example 20 | | | 12.0 | | 1.0 | 25 | 0.41 |
| Comparable Example 21 | | | 12.0 | | 26.0 | 25 | 0.50 |
| Example 42 | | | 12.0 | Alumina | 4.0 | 25 | 0.44 |
| Example 43 | | | 12.0 | Titanium oxide | 4.0 | 25 | 0.44 |
| Example 44 | | Titanium black | 12.0 | Silica | 4.0 | 25 | 0.44 |
| Example 45 | | Aniline black | 12.0 | | 4.0 | 25 | 0.43 |
| Example 46 | Polyethylene naphthalate | Carbon black | 12.0 | Silica | 4.0 | 25 | 0.40 |
| Example 47 | Aramide | | 12.0 | | 4.0 | 25 | 0.43 |
| Example 48 | Polyether sulfone | | 12.0 | | 4.0 | 25 | 0.42 |

TABLE 3-2

| Example | Average direct reflectance in wavelength of 380 to 780 nm (%) | Average optical density in wavelength of 380 to 780 nm (%) | Lightness L* | Surface glossiness | Reflection at the end face and surface glossiness | Change in heating at 155° C. in air for 30 minutes | | | Change in heating at 200° C. in air for 30 minutes | | | Change in heating at 270° C. in air for 30 minutes | | |
|---|---|---|---|---|---|---|---|---|---|---|---|---|---|---|
| | | | | | | Average direct reflectance | Average optical density | Lightness L* | Average direct reflectance | Average optical density | Lightness L* | Average direct reflectance | Average optical density | Lightness L* |
| Example 31 | 0.34 | >4.0 | 30 | 6 | ○ | No | No | No | No | No | No | Yes | Yes | Yes |
| Example 32 | 0.30 | >4.0 | 30 | 5 | ○ | No | No | No | No | No | No | Yes | Yes | Yes |
| Example 33 | 0.21 | >4.0 | 34 | 4 | ○ | No | No | No | No | No | No | Yes | Yes | Yes |
| Example 34 | 0.22 | >4.0 | 35 | 4 | ○ | No | No | No | No | No | No | Yes | Yes | Yes |
| Comparable Example 15 | 0.23 | >4.0 | 35 | 4 | ○ | — | — | — | — | — | — | — | — | — |
| Comparable Example 16 | 0.77 | >4.0 | 32 | 15 | ○ | No | No | No | No | No | No | Yes | Yes | Yes |
| Example 35 | 0.33 | >4.0 | 32 | 5 | ○ | No | No | No | No | No | No | Yes | Yes | Yes |
| Example 36 | 0.27 | >4.0 | 33 | 4 | ○ | No | No | No | No | No | No | Yes | Yes | Yes |
| Comparable Example 17 | 0.34 | 2.8 | 44 | 5 | x | No | No | No | No | No | No | Yes | Yes | Yes |
| Example 37 | 0.32 | 3.5 | 30 | 5 | ○ | No | No | No | No | No | No | Yes | Yes | Yes |
| Example 38 | 0.32 | >4.0 | 30 | 5 | ○ | No | No | No | No | No | No | Yes | Yes | Yes |
| Example 39 | 0.21 | >4.0 | 30 | 4 | ○ | No | No | No | No | No | No | Yes | Yes | Yes |
| Com. Ex. 18 | 0.21 | >4.0 | 32 | 4 | ○ | — | — | — | — | — | — | — | — | — |
| Com. Ex. 19 | 0.52 | 0.3 | 51 | 11 | x | No | No | No | No | No | No | Yes | Yes | Yes |
| Example 40 | 0.34 | >4.0 | 30 | 5 | ○ | No | No | No | No | No | No | Yes | Yes | Yes |
| Example 41 | 0.29 | >4.0 | 29 | 5 | ○ | No | No | No | No | No | No | Yes | Yes | Yes |
| Comparable Example 20 | 0.44 | >4.0 | 31 | 9 | x | No | No | No | No | No | No | Yes | Yes | Yes |
| Comparable Example 21 | 0.27 | >4.0 | 34 | 6 | — | — | — | — | — | — | — | — | — | — |
| Example 42 | 0.32 | >4.0 | 31 | 4 | ○ | No | No | No | No | No | No | Yes | Yes | Yes |
| Example 43 | 0.34 | >4.0 | 30 | 5 | ○ | No | No | No | No | No | No | Yes | Yes | Yes |
| Example 44 | 0.34 | >4.0 | 30 | 5 | ○ | No | No | No | No | No | No | Yes | Yes | Yes |
| Example 45 | 0.35 | >4.0 | 30 | 5 | ○ | No | No | No | No | No | No | Yes | Yes | Yes |
| Example 46 | 0.25 | >4.0 | 30 | 5 | ○ | No | No | No | No | No | No | Yes | Yes | Yes |
| Example 47 | 0.29 | >4.0 | 31 | 6 | ○ | No | No | No | No | No | No | No | No | No |
| Example 48 | 0.27 | >4.0 | 31 | 5 | ○ | No | No | No | No | No | No | Yes | Yes | Yes |

INDUSTRIAL APPLICABILITY

The black heat resistant light shading film of the present invention has a thickness of 25 μm or less, as well as low reflectivity, high light shading performance and low surface glossiness at a visible light region (a wavelength of 380 to 780 nm), and is therefore useful as various optical materials.

In addition, since it contains the black pigment and the inorganic filler, even though heat resistant resin content is low, it is extremely useful as a diaphragm material corresponding to compact sizing and thinner wall thickness of a recent digital camera, a cellar camera phone, a digital video camera, a liquid crystal projector or the like. Further, because of superiority in punching performance, it is extremely useful also as a diaphragm material toward the WLCSP.

Further, because of superior light weight, the black heat resistant light shading film of the present invention can be utilized as a diaphragm blade material for a diaphragm device for a light intensity adjusting module of a liquid crystal projector, or a fixed diaphragm material which is capable of corresponding to assembly by the reflow step, shutter blade material, along with a heat resistant light shading tape, and thus industrial value thereof is extremely high.

The invention claimed is:

1. A black heat resistant light shading film formed with fine unevennesses of both surfaces of a resin film (A) having a heat resistance of 155° C. or higher, the resin film (A) being a black film comprising a black pigment (B) and an inorganic filler (C);
   wherein a thickness of the black heat resistant light shading film is 25 μm or less; a surface roughness (arithmetic average height Ra) of both surfaces is 0.2 to 2.2 μm; and an average optical density of the black heat resistant light shading film, which is an index of light shading performance of light in a wavelength region of 380 to 780 nm, is 3.5 or higher; and a surface glossiness of both surfaces is 8 or less.

2. The black heat resistant light shading film according to claim 1, wherein the average optical density is 4.0 or higher.

3. The black heat resistant light shading film according to claim 1, wherein an average direct reflectance of the both surfaces in a wavelength range of 380 to 780 nm is 0.40% or less.

4. The black heat resistant light shading film according to claim 1, wherein the resin film (A) is a film having, as a main component, one or more kinds of heat resistant resins selected from polyimide, polyamideimide, polyphenylene sulfide, polyethylene naphthalate, aramide, polyether ether ketone and polyether sulfone.

5. The black heat resistant light shading film according to claim 1, wherein the black pigment (B) is a pigment consisting of one or more kinds selected from carbon black, aniline black, titanium black, inorganic pigment hematite and perylene black.

6. The black heat resistant light shading film according to claim 1, wherein a content of the black pigment (B) is 5 to 22 parts by weight, relative to a heat resistant resin (a solid content of 100 parts by weight) in the resin film (A).

7. The black heat resistant light shading film according to claim 1, wherein the inorganic filler (C) is one or more kinds selected from alumina, titanium oxide, silica, zinc oxide and magnesia.

8. The black heat resistant light shading film according to claim 1, wherein a content of the inorganic filler (C) is 2 to 25 parts by weight, relative to a heat resistant resin (a solid content of 100 parts by weight) in the resin film (A).

9. The black heat resistant light shading film according to claim 1, wherein L* (Lightness) is 25 to 40, in measurement of an L*a*b* color system (JIS Z 8729), standardized by CIE (International Commission on Illumination).

10. A diaphragm superior in heat resistance obtained by punching processing the black heat resistant light shading film according to claim 1, wherein an end face of the diaphragm has a low surface glossiness.

11. A light intensity adjusting module, comprising the diaphragm superior in heat resistance according to claim 10.

12. A blade material superior in heat resistance obtained by punching processing the black heat resistant light shading film according to claim 1, wherein an end face of the blade material has a low surface glossiness.

13. A light intensity adjusting module, comprising the blade material superior in heat resistance according to claim 12.

14. A heat resistant light shading tape comprising an adhesive layer at one or both surfaces of the black heat resistant light shading film according claim 1.

15. A method for producing a black heat resistant light shading film, characterized by comprising;
   preparing a slurry by containing and kneading at least a black pigment (B) and an inorganic filler (C) along with a solvent, into a heat resistant resin having a heat resistance of 155° C. or higher,
   coating the slurry onto a supporting substance, drying the slurry to obtain a resin film (A) having a film thickness of 5 to 25 μm and then
   performing matte processing, so that both surfaces of the resin film (A) have fine unevennesses, wherein a surface roughness (arithmetic average height Ra) of both surfaces is 0.2 to 2.2 μm and a surface glossiness of both surfaces is 8 or less.

16. The method for producing a black heat resistant light shading film according to claim 15, wherein a content of the black pigment (B) is 5 to 22 parts by weight, relative to the heat resistant resin (a solid content of 100 parts by weight).

17. The method for producing a black heat resistant light shading film according to claim 15, wherein a content of the inorganic filler (C) is 2 to 25 parts by weight, relative to the heat resistant resin (a solid content of 100 parts by weight).

18. A diaphragm superior in heat resistance obtained by punching processing a black heat resistant light shading film, the black heat resistant light shading film being formed with fine unevennesses of both surfaces of a resin film (A) having a heat resistance of 155° C. or higher,
   wherein the resin film (A) is a black film comprising a black pigment (B) and an inorganic filler (C),
   wherein a thickness of the black heat resistant light shading film is 25 μm or less; a surface roughness (arithmetic average height Ra) of both surfaces of the black heat resistant light shading film is 0.2 to 2.2 μm; and an average optical density of the black heat resistant light shading film, which is an index of light shading performance of light in a wavelength region of 380 to 780 nm, is 3.5 or higher,
   wherein the black heat resistant light shading film is disposed in a camera module with a structure of wafer level chip size package (WLCSP), and
   wherein an end face of the diaphragm has a low surface glossiness.

* * * * *